(12) United States Patent
Diesch et al.

(10) Patent No.: US 12,438,954 B2
(45) Date of Patent: Oct. 7, 2025

(54) METHODS AND SYSTEMS FOR TRANSMITTING INFORMATION

(71) Applicant: QUARTER, Inc., Niwot, CO (US)

(72) Inventors: Michael Diesch, Niwot, CO (US); Tim Enneking, La Jolla, CA (US); Christopher Diesch, Niwot, CO (US)

(73) Assignee: QUARTER, Inc., Niwot, CO (US)

( * ) Notice: Subject to any disclaimer, the term of this patent is extended or adjusted under 35 U.S.C. 154(b) by 0 days.

(21) Appl. No.: 18/046,689

(22) Filed: Oct. 14, 2022

(65) Prior Publication Data

US 2023/0067446 A1    Mar. 2, 2023

Related U.S. Application Data

(63) Continuation of application No. 17/121,510, filed on Dec. 14, 2020, now Pat. No. 11,582,324.
(Continued)

(51) Int. Cl.
| | |
|---|---|
| *H04L 67/60* | (2022.01) |
| *G06F 16/182* | (2019.01) |
| *G06Q 10/20* | (2023.01) |
| *G06Q 20/38* | (2012.01) |
| *G06Q 30/018* | (2023.01) |
| *G06Q 30/02* | (2023.01) |
| *G06Q 30/0645* | (2023.01) |
| *G06Q 40/03* | (2023.01) |

(Continued)

(52) U.S. Cl.
CPC ............ *H04L 67/60* (2022.05); *G06F 16/182* (2019.01); *H04L 9/3236* (2013.01); *H04L 67/108* (2013.01); *G06Q 10/20* (2013.01); *G06Q 20/3827* (2013.01); *G06Q 20/389* (2013.01); *G06Q 30/018* (2013.01); *G06Q 30/0278* (2013.01); *G06Q 30/0645* (2013.01); *G06Q 40/03* (2023.01); *G06Q 40/06* (2013.01); *G06Q 40/08* (2013.01); *G06Q 50/167* (2013.01)

(58) Field of Classification Search
None
See application file for complete search history.

(56) References Cited

U.S. PATENT DOCUMENTS

| | | |
|---|---|---|
| 10,373,129 B1 | 8/2019 | James et al. |
| 10,438,290 B1 | 10/2019 | Winklevoss et al. |

(Continued)

FOREIGN PATENT DOCUMENTS

| | | |
|---|---|---|
| CN | 108428168 A | 8/2018 |
| CN | 109377219 A | 2/2019 |

(Continued)

OTHER PUBLICATIONS

The Potential Role of Tokenization in Affordable Housing, Crypto Properties LLC, Dec. 2018 (Tokenization).*

(Continued)

*Primary Examiner* — Allan J Woodworth, II
(74) *Attorney, Agent, or Firm* — DLA Piper LLP (US)

(57) ABSTRACT

Methods and systems for performing a real property transaction are disclosed. A plurality of tokens can be issued using blockchain. A first network function request related to the real property transaction can be transmitted to a decentralized network. An algorithm can be used to determine which of the plurality of tokens are included in the real property transaction.

20 Claims, 23 Drawing Sheets

Related U.S. Application Data

(60) Provisional application No. 62/948,136, filed on Dec. 13, 2019.

(51) Int. Cl.

|  |  |
| --- | --- |
| *G06Q 40/06* | (2012.01) |
| *G06Q 40/08* | (2012.01) |
| *G06Q 50/16* | (2024.01) |
| *H04L 9/32* | (2006.01) |
| *H04L 67/1074* | (2022.01) |

(56) References Cited

U.S. PATENT DOCUMENTS

| | | |
|---|---|---|
| 10,498,808 B2 | 12/2019 | Purushothaman et al. |
| 2006/0171346 A1 | 8/2006 | Kolavennu et al. |
| 2010/0131426 A1* | 5/2010 | Kroutik ............... G06Q 40/00 705/37 |
| 2018/0262385 A1 | 9/2018 | Hinni et al. |
| 2018/0322597 A1 | 11/2018 | Sher |
| 2018/0352399 A1 | 12/2018 | Nebel |
| 2019/0165930 A1 | 5/2019 | Castinado et al. |
| 2019/0207751 A1* | 7/2019 | Harvey ............... H04L 67/104 |
| 2019/0251552 A1* | 8/2019 | Kurian ............... H04L 9/3247 |
| 2019/0287175 A1 | 9/2019 | Hill et al. |
| 2019/0287195 A1 | 9/2019 | Lee et al. |
| 2019/0303893 A1* | 10/2019 | Ramasamy ........ G06K 7/10366 |
| 2019/0306230 A1 | 10/2019 | Purushothaman et al. |
| 2019/0306235 A1 | 10/2019 | Veale et al. |
| 2019/0311447 A1 | 10/2019 | Strnad, II |
| 2019/0318433 A1 | 10/2019 | McGee et al. |
| 2019/0333030 A1 | 10/2019 | Ramasamy et al. |
| 2019/0333051 A1 | 10/2019 | Brogger |
| 2020/0026785 A1 | 1/2020 | Patangia et al. |
| 2020/0027079 A1 | 1/2020 | Kurian |
| 2020/0042989 A1* | 2/2020 | Ramadoss ............ G06Q 50/167 |
| 2020/0211134 A1* | 7/2020 | Sahagen ............... G06Q 30/06 |
| 2020/0394714 A1* | 12/2020 | Strnad, II ............... G06Q 40/03 |
| 2021/0119785 A1 | 4/2021 | Ben-Reuven et al. |
| 2021/0243272 A1 | 8/2021 | Diesch et al. |

FOREIGN PATENT DOCUMENTS

| | | |
|---|---|---|
| JP | 2004102735 A | 4/2004 |
| JP | 2009151741 A | 7/2009 |
| WO | 2021119618 A1 | 6/2021 |

OTHER PUBLICATIONS

The Potential Role of Tokenization in Affordable Housing, Crytp Properties LLC, Dec. 2018.
Written Opinion cited in Application No. PCT/US20/64934 issued on Mar. 19, 2021.
International Search Report cited in Application No. PCT/US20/64934 issued on Mar. 19, 2021.
Written Opinion cited in Application No. PCT/US22/33269 issued on Oct. 17, 2022.
International Search Report cited in Application No. PCT/US22/33269 issued on Oct. 17, 2022.
Examination Report No. 1 for Australian Patent Application No. 2020401589 dated Mar. 16, 2023, 6 Pages.
First Examination Report for New Zealand Patent Application No. 789751, mailed Apr. 5, 2023, 4 pages.
U.S. Appl. No. 17/121,510, Electronically Captured, 750 Pages.
International Preliminary Report on Patentability for International Application No. PCT/US2020/064934, mailed Jun. 23, 2022, 05 Pages.
Latifi S., et al., "Blockchain-Based Real Estate Market: One Method for Applying Blockchain Technology in Commercial Real Estate Market," 2019 IEEE International Conference on Blockchain, pp. 528-535.
Office Action for Japanese Patent Application No. 2022536662, mailed May 9, 2023, 6 pages.
Smith J., et al., "Tokenized Securities and Commercial Real Estate," 2019.
Extended European Search Report for European application. No. 20899037.4 dated Nov. 9, 2018, 11 pages.
International Preliminary Report on Patentability for the application No. PCT/US2022/033269, mailed Dec. 21, 2023, 6 pages.
International Search Report and Written Opinion for Application No. PCT/US2023/37006, mailed on Feb. 21, 2023, 13 pages.
Office Action for Belize Patent Application No. 1049.22, dated Jan. 11, 2024, 2 pages.
Office Action for Chinese Patent Application No. 202080096564.3, mailed Jan. 2, 2024, 8 pages.
Office Action for Japanese Patent Application No. 2022536662, mailed Oct. 3, 2023, 3 pages.
Office Action for Korean Patent Application No. 10-2022-7023955, mailed Jan. 2, 2024, 6 Pages.
Office Action for Korean Patent Application No. 10-2022-7023955, mailed Mar. 7, 2024, 5 Pages.
Second Examination Report for New Zealand Patent Application No. 789751, mailed Sep. 22, 2023, 6 pages.
International Search Report and Written Opinion for Application No. PCT/US2023/024936, mailed on Jul. 12, 2023, 7 Pages.
Office Action for Chinese Patent Application No. 202080096564, mailed Apr. 28, 2023, 8 pages.
Office Action for Korean Patent Application No. 10-2022-7023955, mailed Jul. 1, 2023,19 Pages.
Office Action for Singapore Patent Application No. 11202250355, mailed Jul. 4, 2023, 10 Pages.
U.S. Appl. No. 17/806,677 captured on Jul. 25, 2024.
U.S. Appl. No. 17/806,677 captured on Oct. 3, 2024.
Office Action for Singapore Patent Application No. 11202250355, mailed Aug. 2, 2024, 11 pages.
Office Action for Thailand Patent Application No. 2201003627, mailed Jul. 25, 2024, 9 pages.
Examination Report for Indian Patent Application No. 202217039929, dated Apr. 21, 2025, 8 pages.
U.S. Appl. No. 17/806,677 captured on May 5, 2025 for Oct. 3, 2024 to May 5, 2025.
U.S. Appl. No. 18/503,881 captured on May 5, 2025.
Extended European Search Report for Application No. 22821194.2, dated Mar. 26, 2025, 9 pages.
Office Action for European Patent Application No. 22821194.2, mailed Apr. 15, 2025, 1 page.
Office Action for Singapore Patent Application No. 11202250355R, mailed Jul. 28, 2025, 6 pages.

* cited by examiner

I. Tenant-in-Common ("TIC") Structure:

III. LLC Structure:

$$A_{tot} = (H_t * H_v) + \sum^h (0.01 * V_h) + (0.01 * R_h * P_h) \quad \text{(Equation 1)}$$

$$U_{tot} = \sum^h D(C_h, E_h, I_h) * U_h \quad \text{(Equation 2)}$$

$$\Delta_h = R_{health} - (U_{tot} + D(C_h, E_h, I_h) * (U_h))/(A_{tot} + (0.01 * V_h)) \quad \text{(Equation 3)}$$

$$D(C_h, E_h, I_r) * U_H = (R_{health} - \Delta_{Hmax}) * (A_{tot} + 0.01 * V_h) - U_{tot} \quad \text{(Equation 4)}$$

$$D(C_h, E_h, I_r) * (1-R)E_h = (R_{health} - \Delta_{Hmax}) * (A_{tot} + 0.01 * V_h) - U_{tot} \quad \text{(Equation 5)}$$

$$D(C_h, E_h, I_r) * E_h = ((R_{health} - \Delta_{Hmax}) * (A_{tot} + 0.01 * V_h) - U_{tot})/(1-R) \quad \text{(Equation 6)}$$

FIG. 8

Minimum Retained Equity - Example Platform Underwriting

MINIMUM
RETAINED
DEBT-TO-INCOME
SCORE
EQUITY
PAYMENT FICO
LIABILITIES
DOWN ASSETS
INCOME
RATIO

The platform can help solve the problem of inflicting the highest interest rates on those who can least afford them by adjusting for consumer risk solely through *minimum retained equity* ("*MRE*"), a requirement for riskier consumers to own proportionately more of their home (e.g., up to ~15%).

FIG. 17

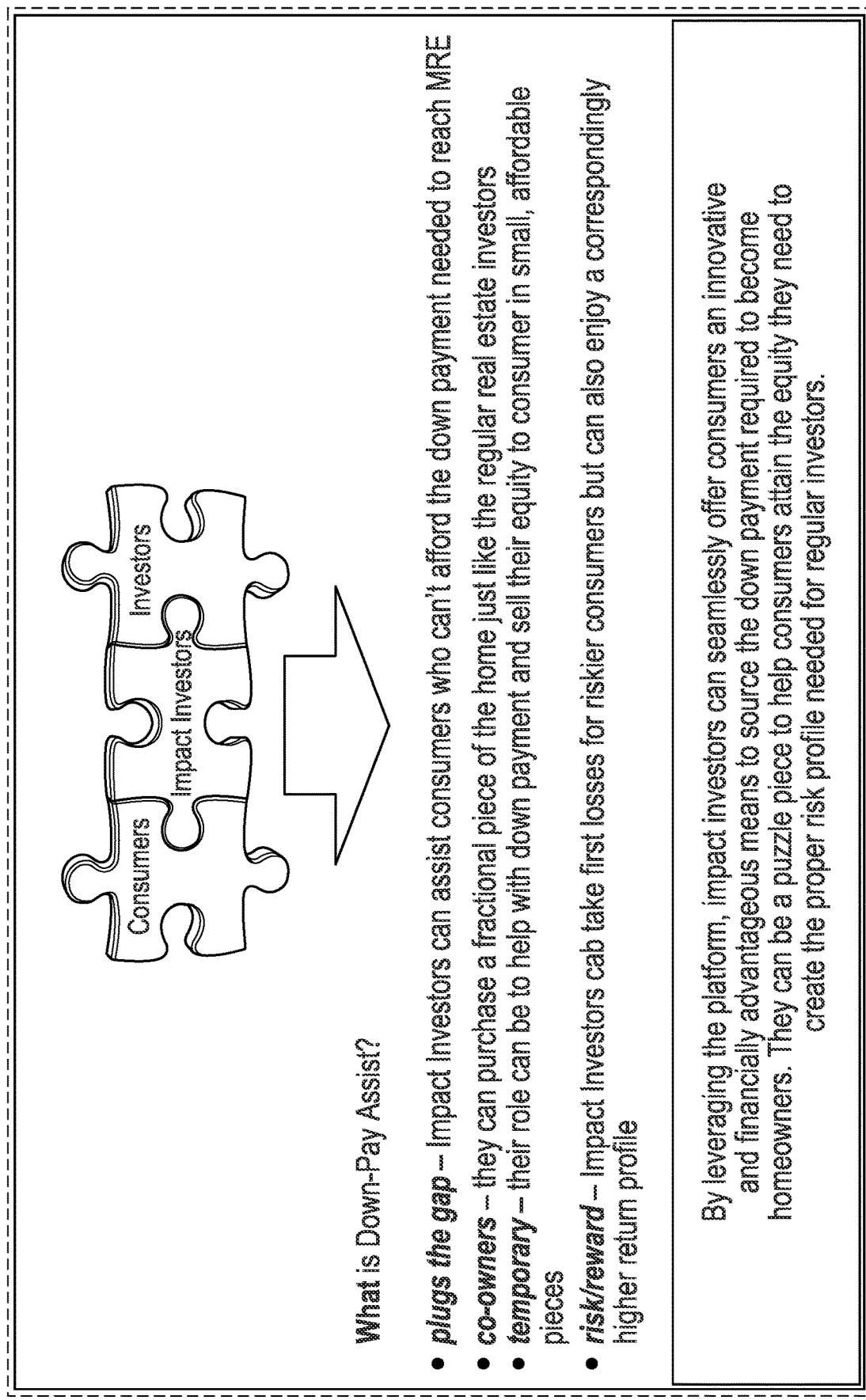

METHODS AND SYSTEMS FOR TRANSMITTING INFORMATION

This application is a Continuation application Ser. No. 17/121,510, filed Dec. 14, 2020, which claims the benefit of U.S. Provisional Application No. 62/948,136, filed Dec. 13, 2019. The entirety of these applications are incorporated by reference in their entireties.

BRIEF DESCRIPTION OF THE FIGURES

FIG. 8 illustrates an example of using blockchain for investing, according to aspects of the disclosure.

FIGS. 14, 15A-15B, 16, 17, 18, 19, 20, 21A and 21B illustrate other example aspects of the disclosure.

DETAILED DESCRIPTION OF ASPECTS OF THE DISCLOSURE

Example Alternatives for Home Investing

Systems and methods are described for using an alternative risk model which does not adjust pricing (rent) to accommodate a borrower's risk profile, but rather adjusts what it terms minimum retained equity (MRE). This approach can level the playing field in the long run by changing the current paradigm in which those who can least afford housing pay the most.

To avoid swapping one problem (e.g., high cost of capital) for another (e.g., high down payment), impact investors can participate alongside return oriented investors by homogenizing home funding across all strata of homeowners and risk profiles.

In some aspects of the disclosure, investment capital can be segmented from the capital supplied by or on behalf of the homeowner in the amounts dictated by quarters MRE calculation. Take the example of a borrower with a 620 FICO score and Debt to Income ratio of 45% wishes to purchase a $200,000 home. A MRE of 14.25% can be calculated based on this borrower's risk profile, meaning that the borrower can have a down payment of $28,500 or 14.25% of the $200,000 purchase price to purchase the home. Investors can purchase the other 85.75% of the home for $171,500, with assurances that the investment is secure due to the MRE calculations and risk pool.

In some aspects of the disclosure, an alternative option may be used when the borrower does not have the required down payment and wishes to rent instead. The capital to meet the MRE requirement can be provided by a combination of both the homeowner and a third-party impact investor. One example of the impact of this type of residential home funding models can be the lower monthly payment obligation of the homeowner. In this case, rent can be, for example, 25-35% lower than both the market rent and the mortgage. This differential can provide an arbitrage opportunity allowing the homeowner to purchase the additional equity held by the impact investor to meet the MRE requirements. The homeowner can purchase the equity from the impact investor over time by simply paying market rent until the minimum equity threshold is met, after which their monthly payment drops to just the amounted required to service the 85.75% holders. Meanwhile, as long as the MRE is continually met by either the homeowner, the impact investor or some combination of both, the investment can look exactly the same to holders of the 85.75% interest as any other investment on the platform.

In some aspects of the disclosure, a 10% equity purchase and resale by an impact investor to a homeowner calculated using market rent payments and a 5 year repurchase window can generate an annualized return of more than 20% for the impact investor. In this case, the impact investors along with the homeowner can take first losses in the event of a homeowner default.

Figure 6:
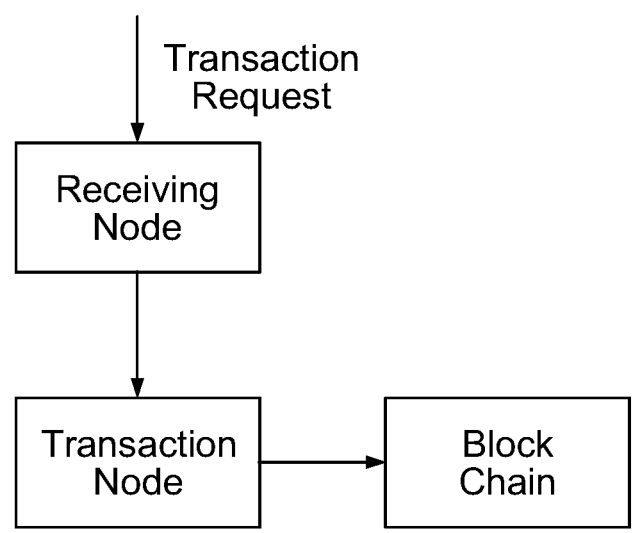
FIG. 6 illustrates an example method for using blockchain, according to aspects of the disclosure.

In some aspects of the disclosure, a framework can be provided to enable impact investors to plug and play with the platform design. An experience can be provided for impact investors that can allow them to easily design a program to their specific needs (e.g., within predetermined guidelines) and leverage the infrastructure with as little effort as possible. For example, this framework can be similar to an Amazon experience, except with impact investors instead of retailers leveraging the infrastructure. In some embodiments, a blockchain based smart contract can be used, although those of ordinary skill in the art will see that a non-blockchain based contract (and software to implement the same) can also be used. FIG. 6 illustrates an example process for using blockchain, according to aspects of the disclosure.

Using Blockchain Based Smart Contracts for Investing

Methods and systems for performing transactions for investing can be done via asset tokens and blockchain based smart contracts, as described herein. Background information on blockchain can be found at the Dec. 13, 2020 blockchain article on Wikipedia (https://en.wikipedia.org/wiki/Blockchain).

Requests for performing such transactions can be received from entities (e.g. investors) that transact in these asset tokens. The asset tokens can be backed by an asset (e.g. real property). While the present disclosure describes in detail transactions with respect to real property assets, the teachings can be implemented on other assets in a similar manner.

In an exemplary embodiment, the asset tokens can be generated using a cryptographic hash of information that uniquely identifies the asset. The tokens can have an owner that uses an additional public/private key pair. The owner public key can be set as the token owner identity, and ownership proof can be established by providing a signature generated by the owner private key and validated against the public key listed as the owner of the token.

Asset tokens can digitize ownership interests in certain assets (e.g. real property) to enhance access to the assets, enable tracking of assets based on their characteristics, and create efficiencies in supply chain management and trade finance. These tokens may be used as a medium of exchange and as an alternative to fiat currencies in, for example, settlement, payments, international remittances, investments, financing, and other activities.

In an exemplary embodiment, asset tokens may be issued and/or exchanged based on availability of inventory of the asset in accordance with established procedures and exchanges for the asset. Transaction of asset tokens can include purchasing of asset tokens, redeeming of asset tokens, transferring of ownership of asset tokens, providing of assets that back the asset tokens, etc. The asset tokens and associated transactions may be recorded in a blockchain based smart contract. Each asset token may be associated with a standardized smart contract that specifies transactions that can be performed on the asset.

Blockchain, as used herein, can be a public ledger of all transactions of a blockchain-based data storage. One or more computing devices may comprise a blockchain network, which may be configured to process and record transactions as part of a block in the blockchain. Once a block is completed, the block is added to the blockchain and the transaction record is thereby updated.

The blockchain may be a ledger of transactions in chronological order or may be presented in any order that may be suitable for use by the blockchain network. In some configurations, transactions recorded in the blockchain may include a destination address and an amount, such that the blockchain records the amount attributable to a specific address. The transactions may be financial and/or include additional or different information such as source address, timestamp etc.

The blockchain may also include data as a form of transaction placed in a distributed database that maintains a continuously growing list of data records hardened against tampering that maintains a continuously growing list of data records hardened against tampering and revision, and may be confirmed and validated by the blockchain network through proof of work and/or any suitable verification techniques associated therewith.

In some cases, data regarding a given transaction may further include additional data that is not directly part of the transaction appended to transaction data. In some instances, the inclusion of such data in a blockchain may constitute a transaction. In such instances, the inclusion of such data in a blockchain may constitute a transaction.

A smart contract, as used herein, can be a computer code that programmatically executes transactions that may be defined by a written contract or other pre-defined conditions. The computer code may be executed in a secure platform (e.g., an Ethereum platform, which provides a virtual machine) that supports recording transactions in a distributed ledger.

Additionally, the smart contract itself may be recorded as a transaction in the distributed ledger using an identity token that is a hash (i.e., identity token) of the computer code so that the computer code that is executed can be authenticated. When deployed, a constructor of the smart contract executes, initializing the smart contract and its state.

The state of a smart contract can be stored persistently in the distributed ledger. When a transaction is recorded against a smart contract, a message can be sent to the smart contract, and the computer code of the smart contract can execute to implement the transaction (e.g., debit a certain amount of asset tokens from the balance of an account).

The computer code can ensure that all the pre-defined conditions are met before the transaction is recorded in the distributed ledger. For example, a smart contract may support the sale of an asset. The inputs to a smart contract to sell a portion of an asset may be the identity tokens of the seller, the buyer, and the asset and the sale price. The computer code ensures that the seller is the current owner of the asset and that the buyer has enough funds in their account. The computer code then records a transaction that transfers the ownership of the asset to the buyer and a transaction that transfers the sale price from the buyer's account to the seller's account.

In an exemplary embodiment, the asset token transactions can be related to the purchase and sale of a portion or an entirety of a real property between one or more property occupants (e.g. homeowners) who reside at the property and/or one or more investors in the property who have a financial interest in the property. The proportion of ownership between the various occupants and investors can be based on a proportion of the tokens and TIC interest that are owned by the entity.

Such transactions can provide capital to homeowners who are not accredited investors to purchase their houses and have an undivided fractional ownership of the house with the investors. For example, if the homeowner funds 5% of the purchase price and investors fund 95% of the purchase price, the homeowner can need to pay rents to the investors for the 95% interests held by the investors per month. The recurring rent payments can be made to the investors via smart contracts. Thus, the investors can receive the cash flow from their investments and the homeowner will have the right to live in the house, subject to the rent payments.

As an example, each home can have 95,000 non-divisible asset tokens minted for transactions. A homeowner-to-be can purchase a 5% interest in the residential property and receive a 5% TIC interest in the home. Investors can purchase a 95% interest in the residential property and receive 95,000 asset tokens. An entity that facilitates this sale (e.g. a real estate website) can receive a commission the net sales proceeds from the consideration paid by the homeowner and the investors.

If a homeowner who owns a fraction of the home has a positive money event, the homeowner may buy more fractions of the home owned by the community of investors. For example, if the homeowner wants to pay an additional $25,000, the asset token ownership positions of all owners can be adjusted, and $25,000 worth of asset tokens can be redeemed and $25,000 worth of TIC ownership transferred to the homeowner. The homeowner's new monthly rent payments can also be reduced accordingly. Alternately, if the homeowner needed more money, the homeowner can trade fractions of the home. In such a case, the homeowner's monthly rent payments can be increased accordingly.

In an exemplary embodiment, only the homeowner can have the right to live in the house. Such occupancy right can be evidenced by an occupant token that would be specific to each residential property. Holding an occupant token can require payment of rent to investors via smart contracts. The occupant token may be involuntary redeemed by the investors if there were an event of default by the homeowner as set forth in the agreement between the homeowner and the investors. When homeowner desires to move out of the house, the homeowner can sell his or her asset tokens and the corresponding occupant token, which would then be transferred to a new homeowner.

Figure 1:
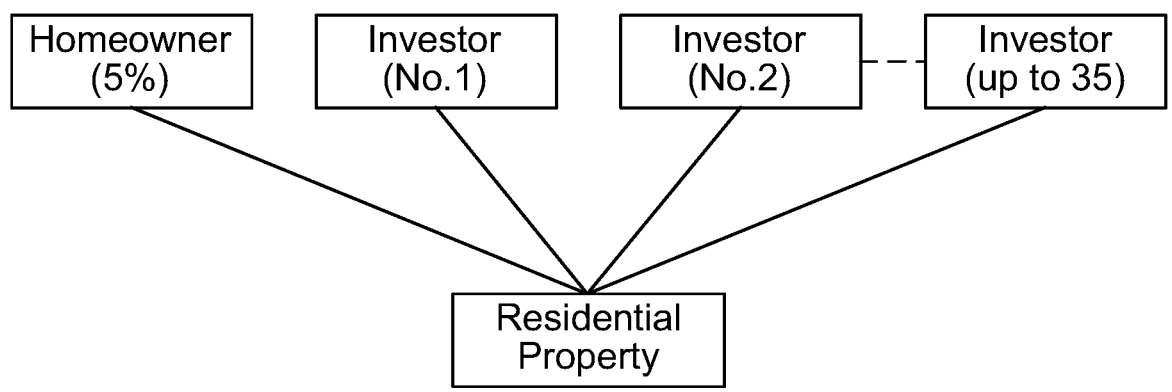
FIGS. 1-4 illustrate various structures that may be used in investing, according to aspects of the disclosure.
Figure 2:
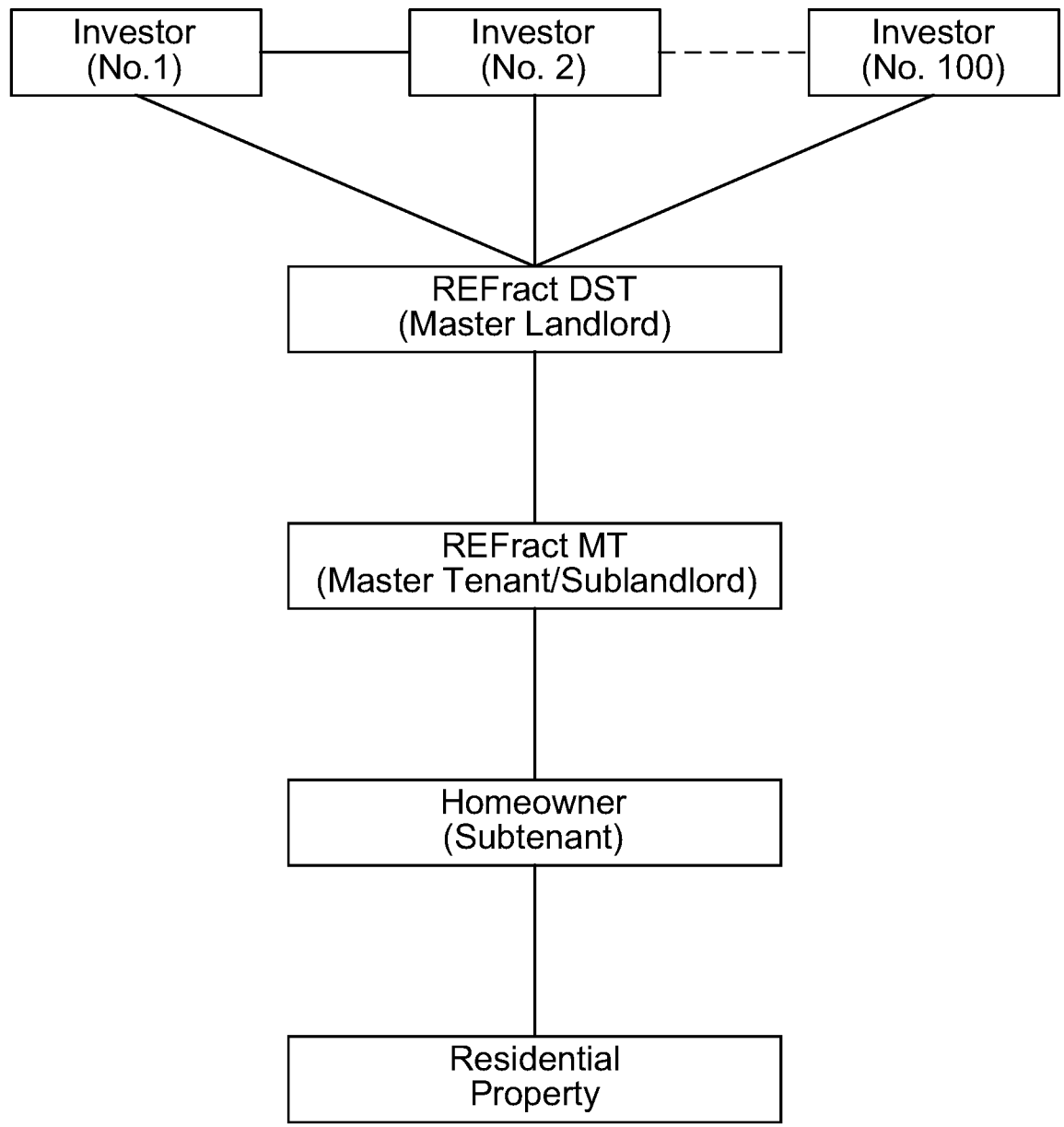
Figure 3:
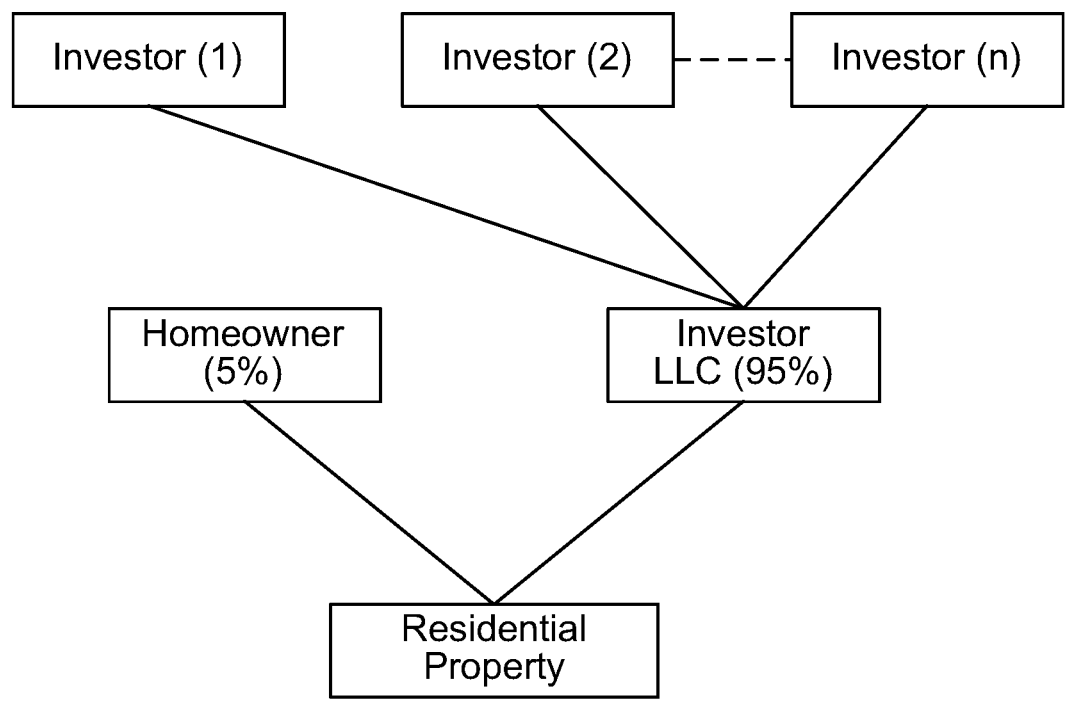
Figure 4:
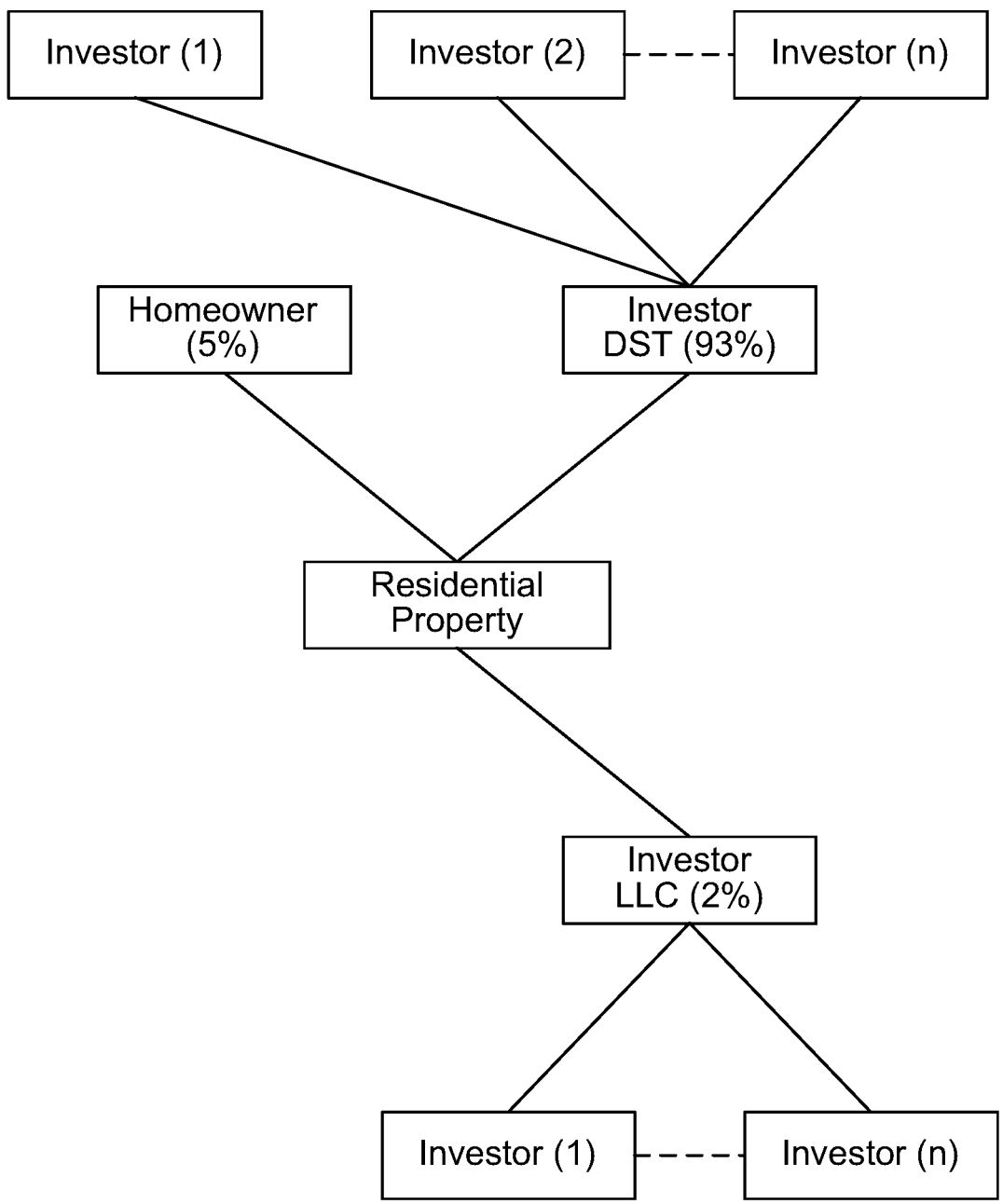

The asset-backed token transactions can be structured in the following ways: (i) Tenant-in-Common (TIC) structure (e.g., see FIG. 1), (ii) Delaware Statutory Trust (DST) structure (e.g., see FIG. 2), and (iii) Limited Liability Company (LLC) structure (e.g., see FIG. 3). (FIG. 4 illustrates a hybrid structure.) Under the TIC structure, the tokens can be represented by direct Tenant-in-Common interests in the asset. Under the DST structure, the tokens can be represented by beneficial interests in a DST to be governed by a trust agreement. This structure can eliminate the need to record a deed to evidence the change of ownership every time a transfer of a TIC Interest is made.

Under the LLC and/or DST structure, the tokens can be represented by membership interests in an LLC and/or DST, which would be the co-tenant with the homeowner. Homeowner may own an undivided fractional (e.g. 5%) TIC ownership interest in the house alongside the remaining (e.g. 95%) TIC ownership interest of the investors' LLC and/or DST. Together, the homeowner's TIC Interest and Investor LLC's and/or DST TIC Interest can collectively constitute a "Co-Tenant TIC Interests" under such a structure.

In such cases, both the homeowner and Investor LLC and/or DST can have voting and management rights, which can be documented via the TIC Agreement. Investors can be the holders of the LLC or DST Interests in Investor LLC and/or DST. If the homeowner wishes to purchase or sell its Co-Tenant TIC Interest from or to Investor LLC, then Investor LLC can facilitate such purchase or sale and adjust the rental payments accordingly relative. If the homeowner wishes to purchase its Co-Tenant TIC Interest from or to Investor DST, then Investor DST can facilitate such purchase and adjust the rental payments accordingly relative.

Example of Using Blockchain for Investing

Example Problem Description

Currently, some methods by which a potential home buyer's risk may be mitigated leads to homeowners in the highest risk class being given higher interest rates to recover potential losses at a given credit score, LTV, and/or DTI. This can lead to homeowners with the least ability to pay having to pay more on their mortgage every month, increasing the likelihood of default.

With a new platform for home ownership, it can be possible to reduce the risk associated with a home buyer by adjusting the amount of equity they hold in their home. If a default occurs, the homeowners equity can be used to recover the loss without putting undo financial strain on the buyer and/or it can also be possible to share the risk of individual assets across the entire network to reduce the stratification of risk that currently exist in the mortgage space.

It can be helpful to determine how much equity a home buyer must hold in their house. This can be referred to as Minimum Retained Equity (MRE). In some aspects of the disclosure, MRE can be based on the risk of the individual home buyer and the performance of Quarter's global risk pool.

Example Definitions

Loan to Value (LTV). LTV can be the ratio loan amount against a property to the actual value of the property.

Minimum Retained Equity (MRE). MRE can be the amount of ownership in a home below which a home occupant is no longer allowed to sell portions of their house.

Debt to Income (DTE). DTE can be the ratio between a home buyer's debt and income.

Example MRE Calculation Flow

Figure 7:
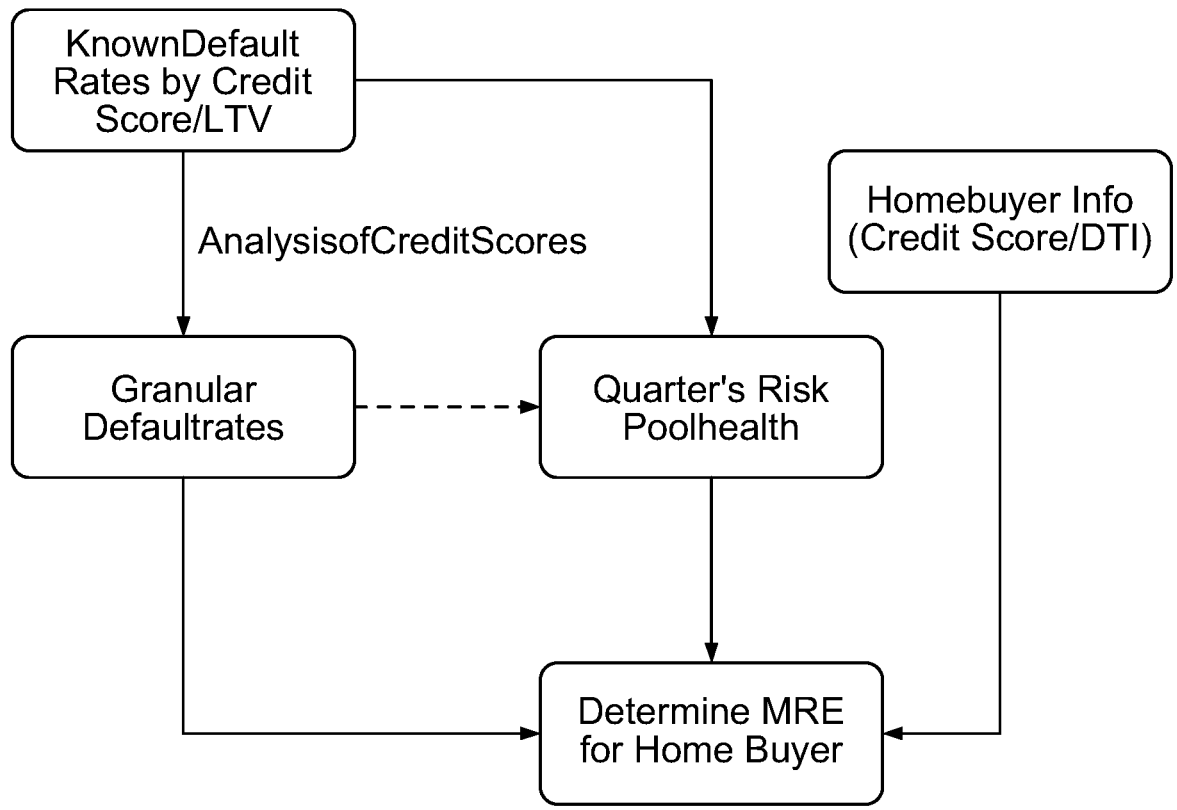
FIG. 7 illustrates an example of an MRE calculation flow, according to aspects of the disclosure.

FIG. 7 illustrates an example MRE calculation flow, according to aspects of the disclosure.

There can be a few things that can be done to evaluate the relationship between credit scores/LTV/DTI and default rates. In the platform model, LTVs don't exist (e.g., as there may not be loans, and instead home ownership may be "fractionalized"). Instead, the LTV value can be roughly equivalent to the MRE and can be treated as such for the purposes of producing initial values to use for the model.

Additionally, to produce more granular data on the relationship between credit scores/LTV/DTI and default rates, the data can be fit to a non-linear model to make determinations about how the scores between the "blocks" of credit scores/LTVs/DTIs behave. A non-linear model can be chosen as the relationship being modeled may be inherently non-linear as there is a threshold above and/or below which changes in either credit score or LTV no longer have an appreciable effect on default rates. The function resulting from the fitting of available data blocks can be a multivariate equation we can represent as $$D(C_s, E_{min}, I_r)$$

Where $C_s$ can be the credit score of a consumer, $E_{min}$ can be the minimum retained equity, $I_r$ can be the Debt to Income ratio (DTI), and/or $D(C_s, E_{min}, I_r)$ can be the expected default rate based on the real world data available.

Once an initial $D(C_s, E_{min}, I_r)$ function is known, a new function can be derived from it such that:

$$E(D_m, C_s, I_r)$$

Where $D_m$ can be the maximum tolerable chance of default, $C_s$ can be the consumer's credit score, $I_r$ can be the debt to income ratio, and/or $E(D_m, C_s)$ can evaluate to the minimum retained equity the consumer may need to have to keep below the maximum tolerable default change.

This can be validated with real world data by comparing the output of $E(D_m, C_s, I_h)$ with the known real-world LTV values at a given credit score and/or known default rates.

As the platform network grows and additional data is available, the $E(D_m, C_s, I_h)$ function can be refit and tuned to provide more accurate data.

Example Risk Pool Health

The platform can be designed to have a risk pool which can share the risks of every property of the network, the risk pool can holds 1% of the value of each home on the network, which can entitle it to 1% of the rent and/or HPI accrual for each property. Additionally this risk pool can be evaluated with the MRE for each property assumed to be recoverable at some rate R. The total assets can be held by the risk pool and can be computed as shown in EQUATION 1, where $H_h$ can be the total number of HPI tokens held by the risk pool, $H_v$ can be the current value of HPI tokens, $V_h$ can be the value of the home, $R_h$ can be the rent rate of the home, and/or $P_h$ can be the number of rent payments made by the occupant of the home The risks this pool may need to be able to cover can be all of the non-recoverable home equity held by homeowners who may be likely to default. This can be called U. U can be calculated for each property as:

$$U_h = (1-R) * E_h$$

Where R can be the normalized recovery rate, and $E_h$ can be the MRE for the property.

Evaluating these values for each home in the network and normalizing them by their likelihood of default (e.g., using an analysis of credit scores) can provide the total loss that is the risk pool that can be responsible for covering using EQUATION 2.

For EQUATION 2, D can be the function described in the analysis of credit scores, $C_h$ can be the credit score for the homeowner, $E_h$ can be the MRE for the homeowner, $I_h$ can be the debt to income ratio for the homeowner, and $U_h$ can be calculated as shown above. Using $U_{tot}$ and $A_{tot}$ we can compute a simple metric for the health of the risk pool:

$$Rhealth = U_{tot}/A_{tot}$$

This metric can be interpreted as follows in some aspects of the disclosure:

$R_{health}$<1: The pool will not have enough assets to cover the expected losses.

$R_{health}$=1: The pool has exactly enough assets to cover the expected losses.

$R_{health}$>1: The pool has more assets than the expected losses.

Example of Determining MRE for a New Home

When a property is being added to the platform, may need to determine what MRE a prospective home buyer must have to have their home added to the network. We can do this by evaluating the effect adding their home will have on the overall health of the platform risk pool. We can do this by evaluating the defining a maximum allowable change in the health of the risk pool a property is allowed to introduce. This can be called $\Delta_{Hmax}$.

We can now compute the change the new home will have on the risk pool in EQUATION 3.

In EQUATION 3, $R_{health}$ can be a current risk pool health, $U_{tot}$ can be the total expected losses for the risk pool, $D(C_h, E_h, I_r)$ can be the expected default chance for the property, $U_h$ can be the unrecoverable losses for the house if it were to default, $A_{tot}$ can be the current value of assets held by the risk pool, and/or $V_h$ can be the value of the home.

By setting the value of $\Delta_h$ to $\Delta_{Hmax}$ we can solve for $E_h$ in EQUATION 4.

Recall that $U_h$ can be a representation of the MRE that cannot be recovered, by substituting $U_h=(1-R)E_h$, as shown in EQUATIONS 5 and 6.

By doing the substitution for $D(C_h, E_h, I_r)$, we can compute the MRE for a given homeowner based on several tunable variables both in the above equation and the hidden ones in the as of yet computed $D(C_h, E_h, I_r)$ function.

Example Use of Smart Contracts and Blockchain for Investing

Figure 9:
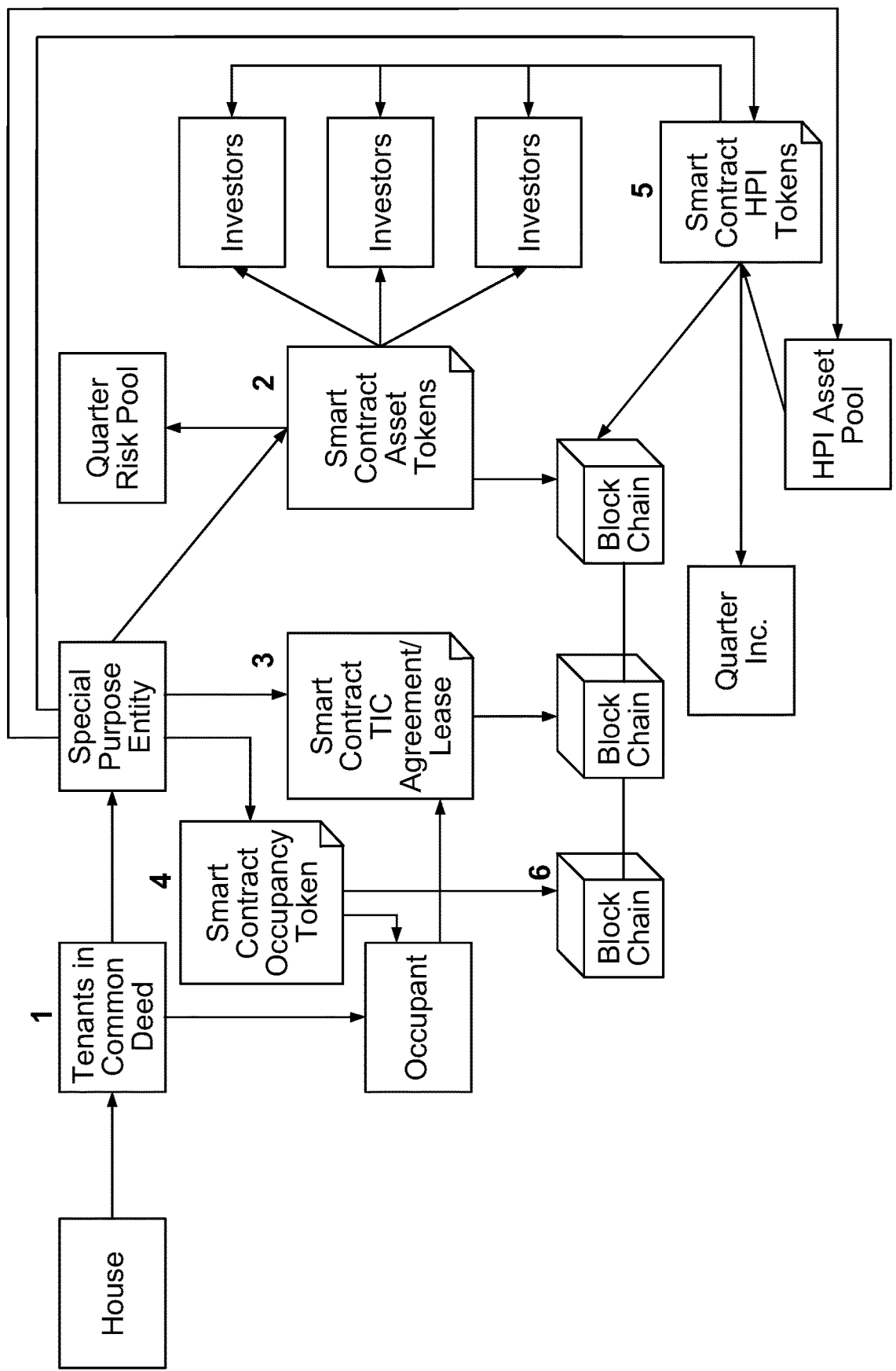
FIG. 9 illustrates various equations that can be used for investing, according to aspects of the disclosure.
Figure 10:
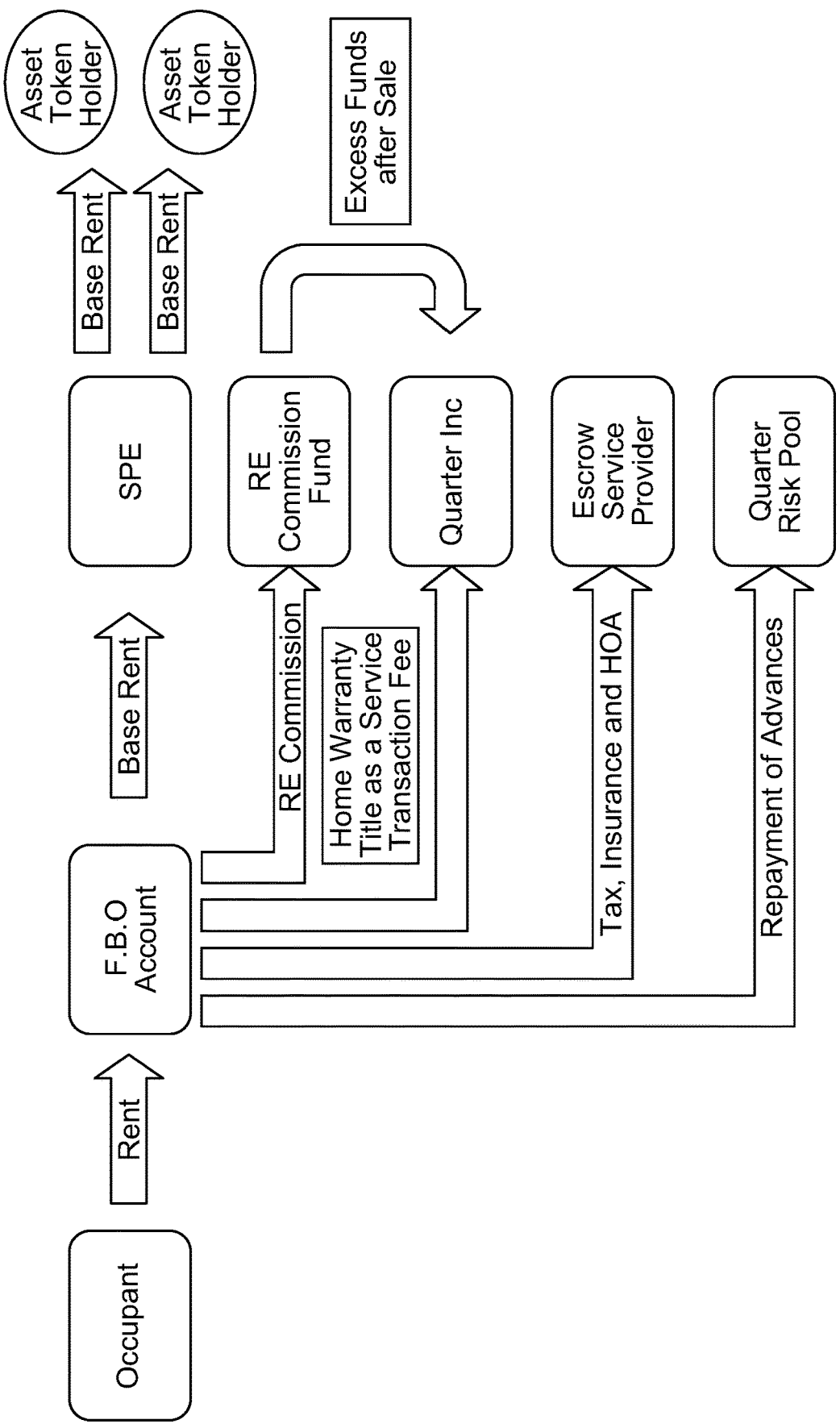
FIGS. 10-12 illustrate various parties, transactions and elements that can be used to board a home onto the platform.

FIG. 9 illustrates an example of how smart contracts and blockchain can be used for investing, according to aspects of the disclosure. In 1, ownership of the home can be granted to both the occupant and the SPE as tenants in common via a warranty deed. In 2, a smart contract can be created by the SPE which can issue asset tokens which can represent ownership in the SPE and can be sold to the investors to fund the purchase of the TIC interest pursuant to step 1. The Asset tokens can be distributed to the investors and also to the risk pool. In 3, a smart contract can be created between the occupant and the SPE which can contains a tenants in common agreement and a lease. In 4, a smart contract can be created by the SPE which can issue the occupancy token to the occupant. In 5, a smart contract can be created which can contain an agreement to assign home appreciation to the HPI asset pool and in exchange can issue HPI tokens which can be included in the sale of asset tokens. The HPI tokens can represent ownership in the appreciation rights and can be distributed to the investors with the asset tokens and also to the platform owner/manager. In 6, all of the transactions can be recorded onto the blockchain.

Detailed Example of Boarding Homes on a Platform

Example Definitions

ALTA: American Land Title Association.

Applicant: A person who may make an application to become a homeowner and occupant of a home on the platform.

Back End DTI. A ratio that can be expressed as a percentage which indicates what portion of a person's monthly income goes towards paying debts.

Base Rent: The amount which may need to be paid each month by the occupant excluding other items (e.g., taxes, insurance, HOA fees, other escrow impounds or pass through payments for third party obligations).

Burned: Burning may refer to the permanent removal of existing tokens from circulation.

Capital Improvement: An improvement which may substantially add to the value of the real property, and/or appreciably prolong the useful life of the real property and/or become part of the real property and/or is permanently affixed to the real property such that removal would cause material damage to the property and is therefore intended to become a permanent installation.

Capital Improvement Value: The calculated value of capital Improvements that may be made to a home by the occupant.

Current Adjusted Asset Token Nominal Value: The nominal value of an asset token, which may be expressed in fiat currency (USD), whose nominal value may have been adjusted since issuance as a result of a decline in the value of the home owned by the SPE.

Current Enhanced Valuation: The valuation of record which may be based using an enhanced valuation methodology such as a BPO, full appraisal and/or other valuation methodology adopted by the platform.

Current Valuation: The valuation of record in the network which may be determined by an Automated Valuation Model (AVM).

Enhanced Rent: The additional amount which may be paid by the occupant to an impact investor, which may be calculated as the market rent less the platform (e.g., owned and/or operated by Quarter) rent for a given home.

Excess Equity: The amount of unencumbered equity which may be held by the occupant which is in excess of their Minimum Retained Equity (MRE).

Fiat Currency: A national currency which can usually be issued by a country's government or central bank, for example US dollars.

HPI Equity Pool: A pool of home equity which can include the aggregate appreciation of all of the homes on the platform.

HPI Realization Percentage: The amount, stated as a percentage between 0 and 100, which can be applied to the HPA for the current period in order to calculate the number of HPI Tokens to be unlocked.

HPI Token: A token issued by the platform which can be backed by the home price appreciation of all of the homes on the platform.

Impact Investor: A person or entity who can assist an applicant in meeting the Minimum Retained Equity (MRE) requirements to qualify to become a homeowner on the platform.

Initial Holder: A person or entity who acquired tokens in an initial issuance directly from the platform owner/operator.

Investor: The holder of an asset token

Minimum Retained Equity: The minimum equity an occupant may need to retain based on current underwriting criteria. This can be a dynamic number which can change based on property and/or occupant profiles at a given moment in time and can be used to manage default risks.

Occupant: The tenants in common owner who may be designated as the homeowner and may be in possession of the occupancy token.

Original Asset Token Nominal Value: The nominal value, expressed in fiat currency (USD), of an asset token upon issuance.

Qualified Institutional Buyer (QIB): A company that can manage a certain amount (e.g., at least $100 million) of securities on a discretionary basis and/or is a registered broker-dealer investing a certain amount (e.g., at least $10 million) in non-affiliate securities.

Quarter Platform Preferred Provider: A real estate agent and/or brokerage with whom the platform network may have negotiated a contract to provide home listing and/or sales services.

Quarter Transaction Fee: A fixed fee which may be assessed by the platform on all transactions which can take place on the platform, except the initial boarding onto and/or the exit of a home from the platform, and/or the initial purchase of asset tokens by the initial holder when a home is boarded into the platform.

Quarter Real Estate Commission Fund: A fund that can be established to pay future real estate sales commissions on behalf of the property owners. This can be funded monthly from the platform fees collected by the platform as the rent payments are made.

Rent: The total payment which may need to be paid each month by the holder of the occupant token which can include base rent, platform fees and when applicable, taxes, insurance and/or HOA escrows.

Retained Risk Pool: A pool of asset tokens which may be held by the network to form a risk-pool for the purpose of mitigating occupant default risk.

Special Purpose Entity (SPE): An entity which can be set up specifically to hold investor interests in a home. The investor(s) can own interests in the SPE, which can be the co-owner of the home pursuant to a Tenants in Common (TIC) deed.

Tenants in Common (TIC): A legal way in which more than one owner of a property can hold title. A Tenants in Common interest can be a legally undivided interest in a property which can be held and may have no right of survivorship.

Tenants in Common Agreement: A legal agreement which can govern how a tenants-in-common partnership will be managed.

Triple Net Lease: A lease agreement that can be held for a property, whereby the tenant or lessee promises to pay all the expenses of the property, including real estate taxes, building insurance, and/or maintenance.

Example Tokens and Methods of Use

Aspects of the disclosure include various tokens that may be used by the software in accordance with the example processes described in the steps below.

Occupancy Tokens

1) The occupancy token can be a non-fungible token which can be issued to a homeowner by an SPE upon execution by the occupant and the SPE of the TIC agreement and/or triple net lease and closing of the purchase of a TIC equity interest in the subject home. The occupancy token can confer certain rights and/or obligations upon the holder as described herein.
   a) The occupant can have the right to occupy the home pursuant to a jurisdictionally specific tenants in common agreement and/or a triple net lease which can contain, for example, the following provisions:
      i) The term can be perpetual unless terminated pursuant to pre-defined terms.
      ii) Rent can be paid by the occupant via the platform to the SPE in an amount that can be calculated as the sum of the base rent, platform fee, accrued late fees, and/or repayments of advances.
         (1) In some cases, the rent payment can also include an impound for taxes, insurance and/or HOA fees.
            (a) The determination of whether there will be an escrow account impound may be based on an algorithm using various consumer and/or property data points and/or local jurisdictional requirements.
            (b) Any impounded escrow payments can be paid to a third party escrow services provider.
      iii) Unless embedded into the rent payment as part of an escrow impound, the occupant may pay, separately from rent, property taxes, hazard insurance premiums and/or HOA fees (including fines) as they become due directly to the appropriate taxing, insurance, and/or HOA authorities/agent(s).
      iv) In addition to other payment requirements contained herein, the occupant may need to timely pay any obligation which may become a lien on the property, including but not limited to: water and/or other utility bills, code enforcement fines, special assessments, and/or contractors hired by occupant to perform work or services on the home.
      v) The occupant may have an obligation to perform and/or pay for all routine maintenance of the property not covered under a home warranty, which may be provided under the terms of the TIC Agreement and/or the triple net lease agreement.
      vi) If the occupant is not in compliance with the maintenance requirements (e.g., section 1(a)(v)) and/or does not cure non-compliance within a pre-defined number of days of notification of the non-compliance, then the occupant can be considered in breach and/or a third party contractor may be hired at the occupants sole expense to perform the necessary maintenance work to bring the home back into compliance, which costs can be due and payable by occupant and added to the amount of the next rent payment.
         (1) Any payment for third party contractors hired (e.g., under section 1(a)(vi)) which fall due prior to the next scheduled rent payment can be advanced from the retained risk pool and can be reimbursed by the occupant.
      vii) Deductibles incurred under the terms of any home warranty program can be paid by the occupant.
      viii) Rent payments can be paid in fiat currency.
      ix) Late payment terms (fees and/or timing) can be determined.
      x) The occupant can be required on each annual anniversary of their acquisition of the occupancy token to take and submit interior and exterior photos of the property using any computer. (Note that any element of the system can be managed by an administrator and/or accessed by a user using any computer or combination of computers (e.g., desktop computer, laptop computer, mobile computer).
      xi) If the occupant does not comply with pre-set rules (e.g., section 1(a)(x)) within a pre-determined amount of time, the occupant can be notified of their non-compliance. If the occupant is still in non-compliance within a pre-determined amount of time after notification of non-compliance, a third party can be contracted to inspect the property and/or photographs and upload the photos. (Any extra costs associated with photos or any other issues related to the home or the system can be added to the amount of the next rent payment.)
         (1) Any payment for a third party contractor hired under pre-defined criteria which may fall due prior to the next scheduled rent payment can be advanced from the retained risk pool and can be reimbursed to the retained risk pool when paid by occupant.
- xii) Any obligations under pre-defined criteria (e.g., sections 1(a)(iii), 1(a)(iv), 1(a)(iv), 1(a)(vi), 1(a)(vii) and/or 1(a0(xi)) which are not paid within a pre-determined amount of time by the occupant can be paid on behalf of the occupant with funds advanced from the retained risk pool and may trigger an automated sale of an amount of excess equity sufficient to reimburse the network for advancing the defaulted payment(s).
- xiii) In the event that there is not sufficient excess equity to fully reimburse the retained risk pool for advances pursuant to pre-defined rules (e.g., section 1(a)(xii)), a lien may be placed on part or the entirety of the occupant's minimum retained equity for the amount of the shortfall.
- xiv) Any payment obligations pursuant pre-defined rules (e.g., section 1(a)(ii)) which are not paid within a pre-defined amount of days by occupant shall be paid on behalf of the occupant with funds advanced from the retained risk pool and may trigger an automated sale of an amount of excess equity sufficient to reimburse the network for advancing the defaulted payment(s).
- xv) If the event that there is not sufficient excess equity to fully reimburse the network for advances pursuant to pre-defined rules, then a lien can be placed on the entirety of the Occupant's Minimum Retained Equity for the amount of the shortfall
- xvi) Placement of a lien (e.g., pursuant to 1(a)(xiii) or 1(a)(xv)) can trigger an eviction proceeding, revocation of the occupancy token, sale of the home, or dissolution of the TIC agreement, or any combination thereof. Local law can be used to determine the eviction proceedings, etc.

b) The occupancy token can confer rights to purchase and/or sell fractional equity as follows:
- i) In order to exercise any put or call rights, occupant may need to be in compliance with all lease obligations.
- ii) The occupant can purchase additional fractions of their home at any time at the current valuation if the amount ($) or % (fractional amount) is <=a pre-determined amount or at the current enhanced valuation if higher.
- iii) The amount of equity to be transferred can be calculated by dividing the relevant valuation (e.g., current or enhanced) by the amount in fiat currency (e.g., USD) of payment excluding any transfer taxes or other fees and the network transfer fee. Equity can be divisible to 0.001 of the valuation (e.g., current or enhanced) and can be transferred by amendment of the TIC deed. Total payment made can be the sum of the equity purchase, plus transfer taxes or fees, and the network transfer tee and can be paid by occupant in fiat currency (e.g., USD).
- iv) The occupant can also sell excess equity in their home at any time at the current valuation if the amount ($) or % (fractional amount) is <=a pre-determined amount or at the current enhanced valuation if higher.
- v) The amount of equity to be transferred can be calculated by dividing the relevant valuation (e.g., current or enhanced) by the amount of fiat currency (e.g., USD) the homeowner can wish to receive, plus any transfer taxes or fees, and the network transfer fee. Equity can be divisible to 0.001 and can be transferred by amending the TIC deed and can be recorded subject to an escrow agreement with a third party title company or other provider of settlement services. The amount of funds received by the occupant can be net of any transfer taxes or fees, and the network transfer fee and can be settled to occupant in fiat currency (e.g., USD).

c) The occupancy token can confer upon the occupant the right to sell the home in its entirety as follows:
- i) The occupant can give notice to the investor(s) of their intent to sell the home and the price at which the home shall be listed.
- ii) Upon receipt of the intent to sell and the initial listing price, the investor(s) can have a right of refusal to purchase the property at the initial listing price for a pre-determined amount of time.
- iii) Upon expiration of the right of first refusal, the occupant may list the property with the realtor who is a network preferred provider.
- iv) Notwithstanding section 1(c)(iii) herein, if the occupant is a licensed realtor, they may act as the listing agent provided they are in compliance with all pre-defined terms and conditions. However, they may only receive a commission based on their pro-rata TIC interest of the home. Further, they may only offer a buyer agent commission less than or equal to a pre-determined amount (e.g., %) of the sales price.
- v) Occupant may use listing and purchase contract addendums provided by the platform, which may state that any liability incurred as a result of occupants breach of the listing and/or sales agreement (e.g., such as a specific performance claim, etc.) cannot attach to the home, and may release and/or otherwise indemnify the investor(s) from any claims related to the listing and/or sale.
- vi) Upon notification of a receipt of an offer which is acceptable to the Occupant and/or is below the list price, the investor(s) can have a right of first refusal for a pre-determined amount of time to match the offer.
- vii) Upon notification by the occupant of receipt of an offer which does not trigger the right of first refusal in section 1(c)(vi), and/or if the investor(s) decline the right of first refusal, and/or the new buyer wishes to use the platform to purchase the home and is qualified to do so, the investor(s) may have a pre-determined amount of time to decide if they wish to retain their interest and/or include it in the sale.
  - (1) A decision by investor(s) to retain their interest in the property may not guarantee that they will retain the same percentage interest as they held previously, as the precise amount of their holdings may be based on the amount that the new occupant purchases relative to what the original Occupant was holding at the time of sale. Equity reallocation may be done pro-rata among all previous investors wishing to retain their interest.
- viii) In the event that the home may be sold to a buyer who uses the platform, the rent and base rent can be recalculated based upon the sale price of the home. This can be true even if the existing investor(s) choose to retain their ownership interest.
- ix) Realtor commissions for the sale of the property can be deducted from the occupant's settlement proceeds with a credit of a pre-determined amount (e.g., 0.00041677%) of the contract sales price for each month the occupant has held their Occupancy Token, up to a maximum of 96 months. Capital for the credit can come from the real estate commission fund.
- x) The occupant can be assessed an exit fee in the amount of a pre-determined amount (e.g., 1% of the sale of the home) unless the occupant uses the proceeds to immediately purchase another home on the platform in which case the fee shall be a pre-determined amount (e.g., 0.5% of the amount of the sale of the home).
- xi) In the event that the home may be sold to a buyer who may not use the network to fund their acquisition, the occupancy tokens (and/or asset tokens) can be redeemed and/or burned, and the TIC Agreement can be terminated and the SPE can be dissolved.
- xii) Settlement of the home sale can occur in US fiat currency.

2) The occupancy token can confer rights upon the holder to make capital improvements to the home and to benefit from those improvements.
- a) Occupants can notify the platform as manager of the SPE not less than a pre-determined amount of time in advance of any plans to make capital improvements to the home.
- b) A current enhanced valuation can be ordered by the platform to determine the pre and post improvement valuation of the home in order to calculate the capital improvement value. The post improvement valuation can require an onsite inspection to confirm the work has been completed.
  - i) Occupant can bear the costs for the valuations.
- c) The capital improvement value can be calculated by subtracting the post improvement value from the pre improvement value.
- d) The TIC agreement can be amended to allocate the capital improvement value to the net proceeds that the occupant can receive upon sale of the home.

Asset Tokens

3) The asset tokens can be a fungible token issued by the SPE which can confer certain rights and obligations on the holder described herein.
- a) The asset tokens can represent ownership in the home for any combination of the following:
  - i) A SPE can be the named entity on the TIC deed on behalf on the investor(s) and can hold the real estate interest.
  - ii) The special purpose entity can initially be a Limited Liability Company (LLC), but could also be a Delaware Statutory Trust (DST), Series LLC, Land Trust or other entity legally entitled to hold real property in the jurisdiction in which the home is located.
  - iii) There may be >1 SPE named on the TIC deed for a home, for example both an LLC and a DST.
  - iv) Asset tokens can be allocated to investors on a pro-rata basis in the same proportion as their ownership in the SPE and can be issued in exchange for a fiat currency investment (USD) in the SPE.
    - (1) The platform may decide to accept other payments, such as stable coins or other fiat currencies in the future.
  - v) The token holder may have pre-determined governance rights in the SPE.
- b) The holders of asset tokens may have any combination of the following rights:
  - i) Right to receive rent payments pursuant to their proportional ownership in the SPE as calculated using a formula which can multiply the sum of the base rent and, subject to section 3(b)(1), any late fees, by the proportional number of asset tokens owned.
    - (1) Late fees paid to occupant can be distributed to the holders of asset tokens proportionally to their holdings unless the underlying payment which generated the late fees was advanced by the retained risk pool in which case the late fees can be distributed to the retained risk pool.
    - (2) Payment can be settled in fiat currency (USD), or optionally in other crypto currencies such as USDC, as may be decided by the platform from time to time.
  - ii) Right to receive HPI tokens on a pro-rata basis in the same proportion as their ownership of Asset Tokens.
  - iii) Payments of net proceeds from any sale of the home owned by the SPE, proportionally to their ownership of asset tokens.
  - iv) A real estate commission free sale can be provided to the SPE in the event of voluntary or involuntary (e.g., occupant default) sale of the entire property except as provided in section 3(b)(iii)(1) below.
    - (1) In the event that the real estate agent or broker is chosen by the SPE owners (e.g., to the extent such a choice is allowed or required), and/or such agent or broker is not a network preferred provider, then the commission credit shall be capped at a maximum of 4% of the sale price.
  - v) Asset token holders can receive uninterrupted rent payments in the event of an occupant default to the limit of the assets held in the retained risk pool.
  - vi) Asset token holders can not be required to fund any out of pocket expenses related to occupant default to the limit of the assets held in the retained risk pool.
  - vii) Funds for advancing payments and/or expenses (e.g., detailed in sections 3(b)(iii), 3(b)(iv), and 3(b)(v)) can be provided on behalf of the SPE by the platform using any combination of assets held in the retained risk pool.
  - viii) The initial holder of asset tokens which may be offered subject to US securities laws may be resold after a pre-determined amount of time (e.g., twelve (12) month) holding period unless the holder is a QIB in which case they can resell the tokens to another QIB without any holding period. After the holding period expires, holders can be free to trade with both accredited and/or unaccredited investors on a secondary exchange.
  - ix) There can be a right to encumber asset tokens for leverage purposes.
  - x) The occupant can have the right, subject underwriting guidelines, to sell a portion of their TIC holdings (e.g., known as excess equity). The asset token holders can be notified of the sale and can have the right but not obligation to purchase additional asset tokens being sold by the SPE to raise the capital to purchase the TIC interest from the occupant. Should more than one asset token holder request to purchase additional asset tokens, then the amount of asset Tokens can be divided and/or sold proportionally between them based on the amount of asset tokens owned immediately prior to the proposed transaction.

c) The holders of asset tokens can have the following obligations:
  i) So long as they are in compliance with all obligations as the holder of the occupancy token, the occupant may request at any time to purchase any fractional TIC amounts of their home from the SPE which may need to be honored.
  ii) Any transaction conducted pursuant to Section 3(c)(i) can be transacted at the current valuation of the home if the pre-determined amount (e.g., $ or % (fractional amount) of the transaction is below a pre-determined amount, and/or at the current enhanced valuation if higher (also see section 1(b)(ii) herein)).
  iii) Net proceeds from any sale conducted by the SPE pursuant to Section 3(c)(i) hereunder may be distributed to asset token holders on a pro-rata basis. Net proceeds can be calculated under pre-determined rules. For example, as the total amount paid by the occupant minus the transaction fee and less any other costs of sale or transfer (recording fees, title costs, transfer taxes, etc.).
  iv) Transfers of TIC interests from the SPE to the occupant can be recorded on an amended deed and recorded subject to an escrow agreement with a third party title company or other provider of settlement services.

HPI Tokens

4) HPI tokens can be a fungible token issued by (a bankruptcy (BK) remote SPE which can exist for the purpose of holding the HPI equity pool assets and issuing the HPI tokens OR by the SPE which has contracts with the BK remote SPE such that each SPE can issue the HPI tokens independently). HPI tokens can be backed by a pool of equity generated by appreciation of every home (or a subset of homes) on the platform. The ownership of this equity can be transferred to the HPI equity pool by the asset token holders in exchange for HPI tokens.
  a) HPI tokens can be issued contemporaneously with asset tokens when a home can be initially boarded onto the platform.
    i) HPI tokens issued with asset tokens can be locked when issued and/or can remain so unless they are unlocked pursuant to 4(d)(i) of this section.
    ii) Locked HPI tokens may not be separable from asset tokens and may transfer as part of any secondary transfers which occur subsequent to issuance.
    iii) A contract can be created with the SPE at the time a property is boarded which can assign the value of the home appreciation to the HPI asset pool, which can be collected upon sale and exit of the home from the platform.
  b) The platform can establish predetermined time periods, known as HPI Intervals, when it can update the valuation of each home on the platform for the purpose of calculating the change in the value of each home during that period.
  c) At a designated time at the end of each HPI Interval, the home price appreciation (HPA) or home price depreciation (HPD) can be calculated. The calculation can be the difference between the valuation conducted at the end of the previous HPI Interval and the valuation conducted at the end of the current HPI Interval.
    i) In the event that a home was boarded onto the platform during the current or immediately preceding HPI Interval and/or the occupancy token was transferred to a new occupant during the current or immediately preceding HPI Interval, then the valuation of the home at the time of boarding or transfer shall be substituted for the previous HPI interval valuation.
      (1) Pro-rata adjustments can be made if the first period is within a pre-determined amount of time.
  d) In the event that the valuation at the end of the current HPI Interval exceeds either the valuation at the end of any previous HPI Intervals, which have occurred during the tenure of ownership of the current asset token holder, and/or the value at boarding and/or transfer as described in section 4(c)(i), then this valuation can also be designated as the HPI high-water mark.
  e) In the event that the valuation for the current HPI interval does not exceed the HPI high-water mark, then no HPI tokens may be unlocked.
  f) In the event that the current valuation falls below the HPI high-water mark as a result of one or more periods of HPD and/or the asset token can be transferred to another owner:
    i) The high-water mark can be removed.
    ii) The new owner's future right to unlock HPI tokens can be based on HPA calculated pursuant to section 4(c), starting with the valuation from the most recent HPI Interval prior to the transfer to the new owner.
    iii) The original asset token nominal value can be replaced with the current adjusted asset token nominal value which can be calculated as the proportional value of asset tokens based on the lesser of the current valuation at time of transfer and/or the valuation at the end of the most recent HPI interval.
  g) If the HPA for the current period is >0 and the current valuation at the end of the period is greater than the high-water mark, then HPI can be unlocked based on the following formula:
    i) The number of HPI tokens unlocked for each asset token can be computed by dividing the lesser of either the total HPA (e.g., in USD) minus the HPI high-water mark (e.g., in USD) or the total HPA (e.g., in USD), by the market price of the HPI tokens (e.g., also in USD) then multiplying the quotient by the HPI realization percentage (e.g., initially set at 90%) and then dividing the product by the total number of asset tokens held by investors.
  h) When a home which has appreciated sufficiently to cause issuance of HPI tokens pursuant to this section is sold, the net proceeds from the sale, which the HPI token pool can be entitled to receive pursuant to the issuance of HPI tokens can be utilized to purchase HPI tokens which can then be burned.

Underwriting Procedures

Property Diligence

5) A standard set of diligence on every property can be conducted prior to such property boarding onto the network:
  a) The current market value can be determined using a variety of possible methodologies. As defined in this document, there may be at least two tiers of valuations which may be utilized within the network: current valuation and/or current enhanced valuation
    i) Current valuations can be the default valuation of record within the system and/or can be performed using a best in class pre-determined third party AVM.
    ii) Enhanced valuations can be used in place of current valuations when certain trigger events occur. An enhanced valuation may include any combination of AVMs, physical appraisals, brokers price opinions, sales contracts, asset token sales, or other pre-determined relevant inputs.
   iii) All valuations can be independent and provided to the network by non-affiliated third parties.
b) The physical condition of the property can be evaluated and documented. There can be a standard set of pre-determined inspections (e.g., wood destroying insects, radon testing, septic tank inspections, water quality, mold, private well inspection) supplemented by local practice which can be determined on a jurisdictional level. Any combination of inspections can be incorporated into a single home warranty inspection certificate and/or policy.
   i) Physical condition can be determined using best in class products and services utilizing independent third party providers.
c) Title to the property can be examined and a title insurance policy can be issued in order to ensure that both the occupant and/or SPE have an unencumbered interest after the closing occurs and can be protected by insurance in the event of a defect in the title. This can be true in both a new purchase and when an existing homeowner boards the home they currently own onto the platform.
   i) In the case of a new purchase, an ALTA owner's title insurance policy may need to be purchased.
   ii) In the case of an existing homeowner boarding the home they currently own an ALTA owner's title insurance policy may also needs to be purchased (e.g., only to the extent that the SPE needs to be covered given that the occupant is already on title).
   iii) Any necessary endorsements (e.g., survey, flood, environmental, etc.) can be made.
   iv) Title can convey to the SPE and Occupant and the policy can form the starting basis of the blockchain ledger for ownership tracking.
   v) Title insurance vendors can be independent and/or unaffiliated with the network.
d) All property diligence described in this section can be archived within the platform and/or its underlying blockchain.

Occupant Diligence

6) The following diligence can be performed for each future occupant (and/or current applicant(s)) as part of the application process before they are approved to board onto the network and are issued an occupant token:
   a) An applicant credit review can be conducted by running a third party, tri-bureau credit report which can be used to determine:
      i) The FICO (any version of FICO can be used). The minimum can be a pre-determined amount (e.g., 620) to qualify. Credit scores can be retained and accessible to pre-determined parties. A vendor can be required to store this information on the platform's behalf for a pre-determined amount of time.
   b) Income for the applicant(s) can be determined by:
      i) In the case of a TrueConnect applicant, the payroll census file to the extent that that is the only source of income needed for qualification.
      ii) By utilizing an independent, third party income verification service.
   c) A back end debt to income ratio can be determined for each applicant/application by any combination of:
      i) Gathering data from the application(s).
      ii) Gathering data from the credit reports.
      iii) Discrepancies in liabilities between the application and/or credit reports can be reconciled by using an independent third party verification service.
   d) The amount of minimum retained equity can be determined by an algorithm which can use the applicants credit score, back end DTI, risk pool composition, or property specific data as inputs, or any combination thereof. The minimum retained equity can be used to calculate the minimum down payment required by the applicant to close the transaction.
      i) In the case of a new purchase, the applicant can have the ability to transfer the amount of fiat currency (e.g., USD) equal to the value of the minimum retained equity to (e.g., the settlement agent or another party) in order to proceed with the approval. The applicant may need to actually transfer the money, show the funds in an account, or verify with a third party (e.g., Finlocker, or a third party asset verification service).
      ii) In the case of an existing homeowner boarding a home they currently own, there may need to be equity in the property after closing which is equal to or greater than the minimum retained equity requirement.
      iii) Notwithstanding sections 6(d)(i) and 6(d)(ii) above, a portion of the homeowners minimum retained equity may be provided in part by an impact investor as described in section 7 herein.

Impact Investing on the Platform

7) In order to facilitate home purchases by applicants who would not otherwise qualify to purchase a home, the platform can have an infrastructure which can allow impact investors to leverage the platform to assist those applicants.
   a) Any requirement that the occupant must fund the minimum retained equity as described in section 6(e)(i) can be modified to allow the impact investor to assist with funding the minimum retained equity.
   b) The minimum credit score requirement described in section 6(a)(i) can be waived in order to allow the impact investor to set their own minimum qualification criteria.
   c) The impact investor may purchase asset tokens in an amount computed as the minimum retained equity less the amount of equity purchased by the occupant, provided that occupant must purchase not less than a pre-determined amount (e.g., % of the equity at closing) from their own funds.
      i) Asset tokens purchased by an impact investor can be locked and may only be unlocked when any combination of the following occurs:
         (1) The occupant purchases equity from the impact investor, in which case a corresponding number of asset tokens can be unlocked, redeemed and/or transferred to treasury; or
         (2) The occupant chooses to exercises their right to sell the property, in which case the asset tokens can be (a) unlocked, redeemed and/or burned after distribution of the proceeds of the sale of the property in the event that the home leaves the network (e.g., the new purchaser chooses not to use the platform) or, (b) unlocked, redeemed and/or transferred to treasury after distribution of net proceeds from the sale; or
         (3) The occupant is in default and the home is sold in which case the asset tokens can be (a) unlocked, redeemed and/or burned after distribution of the proceeds of the sale of the property in the event that the home leaves the network (e.g., the new purchaser chooses not to use the platform), and/or
(b) unlocked, redeemed and/or transferred to treasury after distribution of net proceeds from the sale.
ii) Impact investors asset tokens can be entitled to pro-rata distribution of net proceeds in the event of sale of the home pursuant to sections 6(b)(i)(2) and 6(b)(i)(3) subject to the following formula:
(1) Net proceeds from sale less any advances made by the platform pursuant to Sections 3(b)(iii), 3(b)(iv), and 3(b)(v) herein plus any recovery from sale of the occupant's TIC interests in the home.
d) Asset tokens held by impact investors can be entitled to their pro-rata share of the rent plus 100% of the enhanced rent paid by the occupant.
i) A portion of the enhanced rent payment can be used to purchase additional TIC interests in the home from the impact investor's holdings in the SPE.
ii) Upon purchase of TIC interests equal to the entirety of the impact investors holdings in the SPE, enhanced rent payment obligations of the Occupant can terminate.

Figure 11:
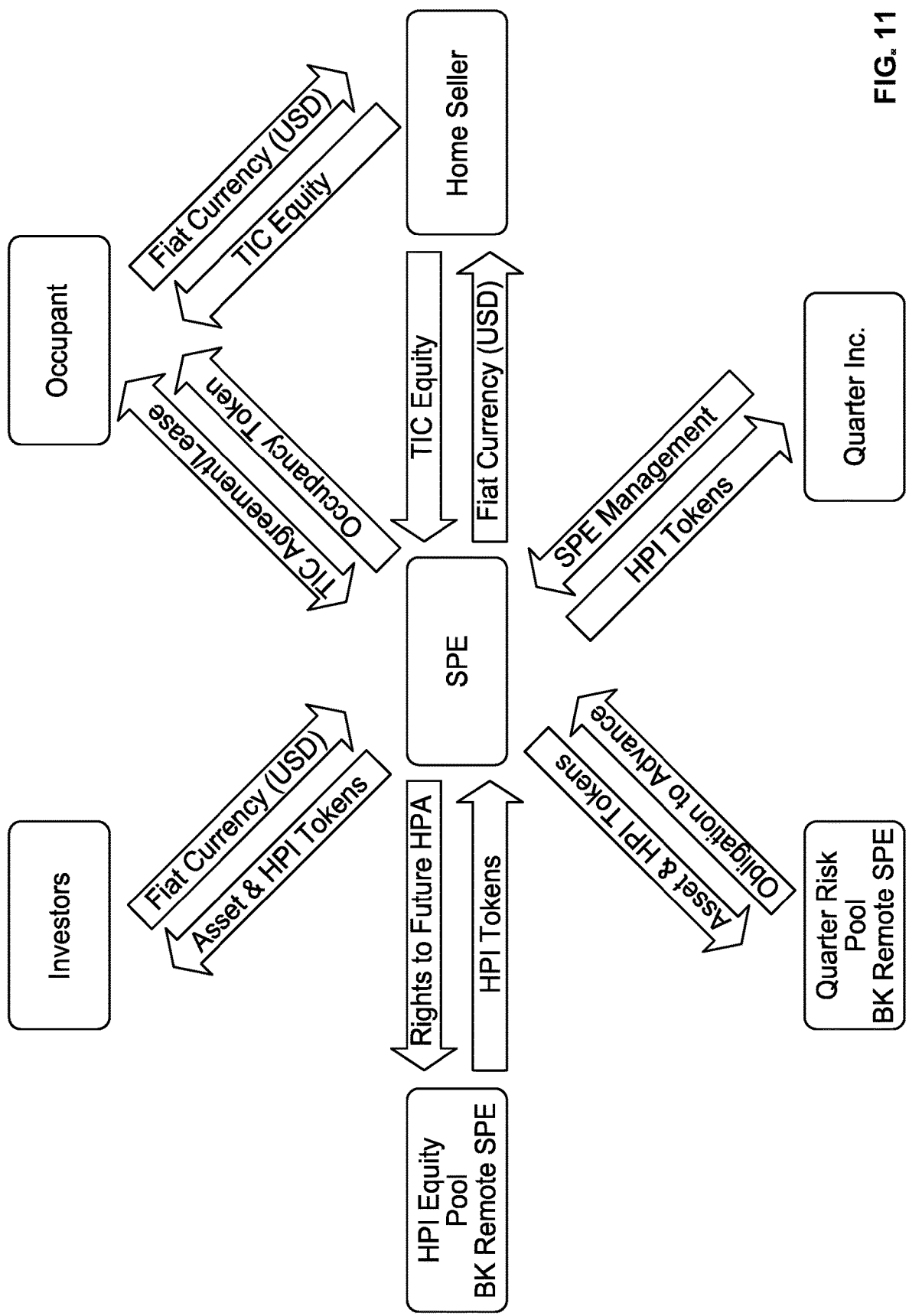

Boarding onto the Network
Parties and Initial Transactions
8) FIG. 11 is an illustration of the parties and transactions that can be required to board a home onto the platform.
a) Seller can be the individual or entity who is selling a home which may be purchased by the occupant and the SPE and boarded onto the platform.
i) The seller can receive fiat currency (e.g., USD) from the occupant pursuant to a real estate closing and can issue a warranty deed to the occupant as one of two Tenants in Common.
ii) The seller can receive fiat currency (e.g., USD) from the SPE pursuant to a real estate closing and/or can issue a warranty deed to the SPE as one of two tenants in common.
iii) Beyond the real estate transaction, the Seller may not need to have no affiliation and/or ongoing relationship with the platform or any of the other parties.
b) Occupant can be the consumer who initiates the acquisition of the property and/or becomes the holder of the occupant token.
i) The occupant can pay fiat currency (e.g. USD) to the seller pursuant to the real estate purchase transaction and/or in return can receive a warranty deed granting occupant a tenants in common interest in the home.
ii) The company that owns the platform that connects and/or manages the relationships and transactions between all of the parties can set up the SPE and/or manage the ongoing administrative functions on behalf of the other SPE owners and in return, can be allocated HPI tokens by the SPE.
c) Investors can be the providers of capital to the SPE, which can enable the SPE to purchase an interest in the home alongside the occupant.
i) The investors can purchase asset and HPI Tokens from the SPE, which can be paid for in fiat currency (USD). SPE can be the entity which can own the real estate interest on behalf of the investors.
ii) The SPE can sell asset tokens to investors who can purchase them in fiat currency (USD)
iii) The SPE can purchase an interest in the home from the seller in fiat currency, and in return can receive a warranty deed granting the SPE a tenants in common interest in the home.
iv) The SPE can execute a tenants in common agreement and/or a triple net lease with the occupant, and in consideration, can issue the occupancy token.
v) The SPE can enter into a contract granting the rights to a proportional share of all future appreciation to the HPI pool and in consideration can be issued HPI Tokens by the HPI pool.
d) The HPI pool can be a BK remote SPE which can receive all of the future HPI gains from the SPE in exchange for issuing HPI tokens to the SPE.
e) The Risk Pool can be a BK remote SPE which can enter into a contract to advance rent and default costs to the SPE, and in consideration can be issued asset tokens by the SPE.

Figure 12:
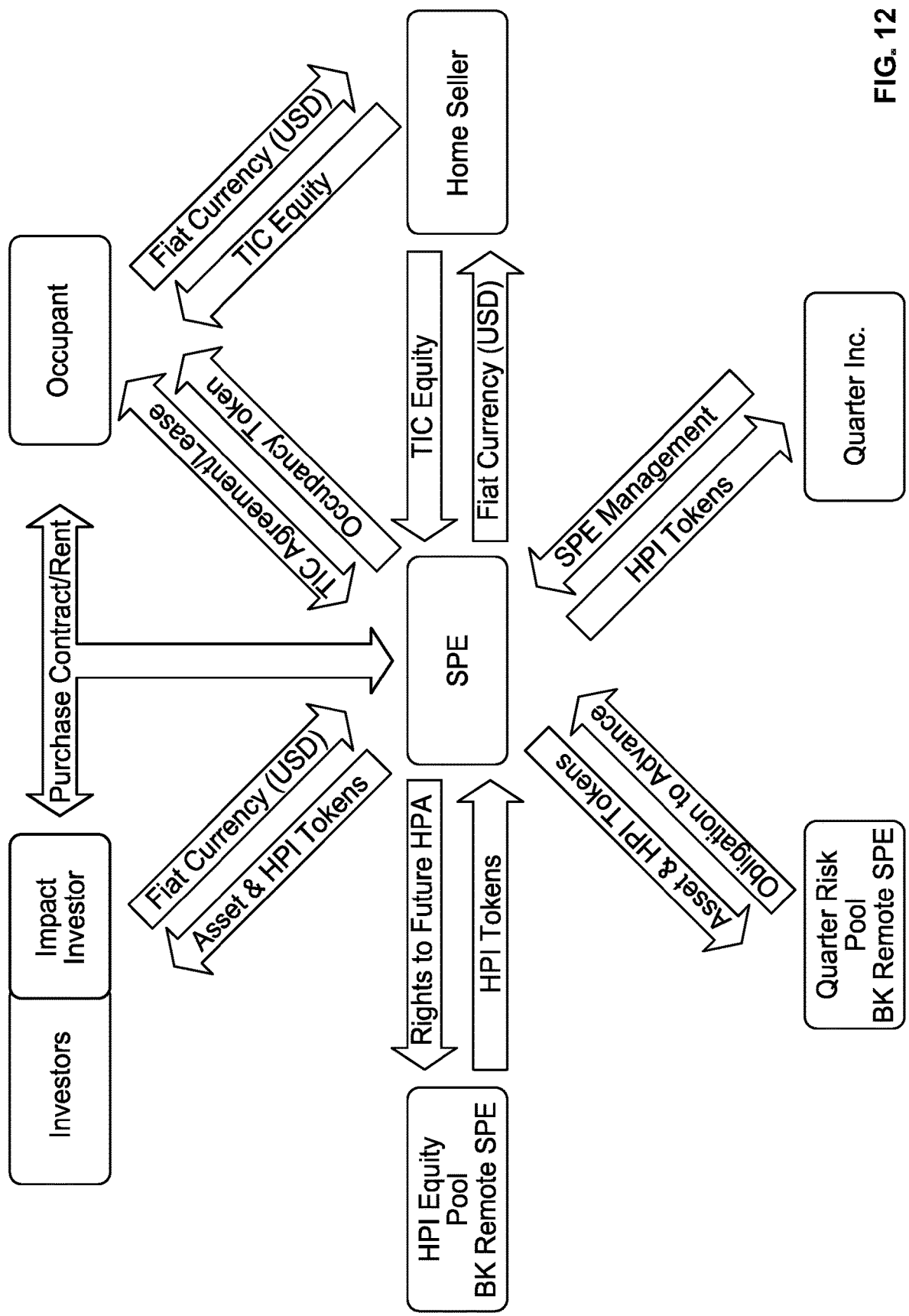

Parties and Transactions
9) FIG. 12 is an illustration of example parties and/or transactions that can be required to board a home onto the platform in the impact investor program.
a) Seller can be the individual or entity who is selling a home which may be purchased by the Occupant and the SPE and boarded onto the Quarter Platform.
i) The seller can receive fiat currency (e.g., USD) from the occupant pursuant to a real estate closing and/or can issue a warranty deed to the occupant as one of two tenants in common.
ii) The seller can receives fiat currency (e.g., USD) from the SPE pursuant to a real estate closing and/or can issue a warranty deed to the SPE as one of two tenants in common.
iii) Beyond the real estate transaction, the Seller may not need to have any affiliation or ongoing relationship with the platform (or the platform owner and/or manager) or any of the other parties.
b) Occupant can be the consumer who can initiate the acquisition of the property and/or can become the holder of the occupant token.
i) The occupant can pay fiat currency (e.g., USD) to the seller pursuant to the real estate purchase transaction and in return can receive a warranty deed granting occupant a tenants in common interest in the home.
ii) The occupant can enter into an agreement with the impact investors and/or the SPE to:
(1) purchase an amount of the SPE's interest which can be equal to the impact investors proportional ownership in the SPE; and
(2) pay an additional amount each month to the SPE, a portion of which can be used to fund the purchase described in section 9(b)(ii)(1) and the balance being allocated to the impact investors as additional rent.
c) The company which owns the platform that can connect and/or manage the relationships and/or transactions between all of the parties.
i) The company can set up the SPE and/or manage the ongoing administrative functions on behalf of the other SPE owners and in return, can be granted HPI tokens by the SPE.
d) Investors can be the providers of capital to the SPE which can enable the SPE to purchase an interest in the home alongside the occupant.
i) The investors can purchase asset and/or HPI tokens from the SPE which can be paid for in fiat currency (e.g., USD).
e) Impact investor can be a capital provider to the SPE and/or benefactor of the occupant who can purchases asset tokens from the SPE in, for example, not less than the amount which is equal to the occupant's MRE less the amount of TIC interests the occupant purchases.
    i) The impact investor can enter into an agreement with the SPE and/or the Occupant with the following terms:
        (1) The impact investor can guarantee the performance of the occupant and/or pledge the asset tokens it owns to the SPE.
        (2) In exchange for a supplemental rent payment each month, the impact investor can sell to the SPE a portion of their asset tokens equal to the amount of TIC interest purchased each month by the Occupant.
        (3) The Impact Investor may not be entitled to HPI tokens under pre-determined circumstances.
f) SPE can be the entity which owns the real estate interest on behalf of the Investors.
    i) The SPE can sell asset tokens to investors who can purchase them in fiat currency (e.g., USD).
    ii) The SPE can also sell asset tokens to impact investors who can purchase them in fiat currency (e.g., USD).
    iii) The SPE can purchase an interest in the home from the seller in fiat currency and/or in return receives a warranty deed granting a tenants in common interest in the home.
    iv) The SPE can execute a tenants in common agreement and/or a triple net lease with the occupant and in consideration, issues the occupancy token.
    v) The SPE can enter into a contract granting the rights to a proportional share of all future appreciation to the HPI Pool and in exchange ca be issued HPI tokens by the HPI pool.
    vi) The SPE can enter into an agreement with the impact investors and the occupant which can have any combination of the following provisions:
        (1) The SPE can receive an additional payment amount each month from the occupant, paid in fiat currency (e.g., USD), a portion of which can be designated as the purchase additional TIC interests and/or the remainder can be paid to the impact investor as additional rent which can be supplemental to the proportional amount they are entitled to based on ownership of asset tokens.
        (2) Fiat currency received from occupant pursuant to section 9(f)(vi)(1) can be used to redeem asset tokens owned by the impact Investor proportionally to the TIC interests purchased by the occupant.
        (3) Asset tokens owned by the Impact Investor may not need to be entitled to HPI tokens
        (4) Asset tokens owned by the impact investor can be pledged to guarantee occupant's performance.
g) HPI pool can be a BK remote SPE which can receive all of the future HPI gains from the SPE in exchange for issuing HPI tokens to the SPE.
h) Risk Pool can be a BK remote SPE which can enter into a contract to advance rent and/or default costs to the SPE and in consideration is issued asset tokens by the SPE.

Services

10) The following services can be provided in order to board a property and occupant onto the network:
    a) Consumer diligence (e.g., third party underwriter such as Evolve)
        i) Credit analysis (e.g., credit report and scores)
        ii) Capacity to repay analysis (e.g., income verification/assets if asset depletion)
        iii) Asset verification (e.g., down payment)
        iv) Know your customer (KYC)/anti-money laundering (AML)/etc.
    b) Property diligence
        i) Valuation determination (e.g., AVM, other as required)
        ii) Property condition (e.g., inspections)
    c) Settlement agent can provide one or more of the following services:
        i) Doc prep and review (e.g., TIC deed, closing statements, etc.)
        ii) Lien payoff calculations
        iii) Tax and other proration calculations
        iv) Notary services
        v) Funds escrow accounts and make disbursements
        vi) Document recording
        vii) Trailing docs
    d) Title Insurance Company
        i) Title exam and commitment issuance
        ii) Policy issuance
    e) Home warranty
        i) Policy or contract issuance
    f) Hazard Insurance
        i) Policy issuance
    g) Escrow impound account
        i) Setup and funding
        ii) Ongoing management and reporting
    h) Servicing
        i) Via Quarter Platform if not in default
        ii) Special servicing company if in default
    i) SPE Setup and governance
        i) Quarter can perform the necessary tasks to setup and manage the SPE
            (1) Locally compliant
            (2) Ongoing admin and governance
        ii) Token Issuance
            (1) SPE can issue the Occupancy and Asset Tokens upon receipt of (TDB)
            (2) HPI Asset Pool SPE can issue the HPI Tokens.

Other Example Aspects of the Disclosure

Methods and systems can be provided for performing a transaction via asset tokens and a blockchain based smart contract, the method comprising: receiving a transaction request for an asset token; checking inventory of an asset associated with the asset token; performing a transaction associated with the transaction request when enough inventory is available, wherein the transaction includes transfer of asset tokens between entities; and recording the transaction in a blockchain based smart contract. This can allow automation of matching requests for those who wish are or obligated to sell with those who wish or are obligated to acquire the asset token. This can also allow automated and/or enforceable compliance with contractual obligations. This can create a secure and/or immutable record of each of the transactions, thus creating a chain of title which is difficult to contest. This can enable use of an algorithm to determine which tokens are included in the transaction requisition and which ones to exclude. For example, FIFO (first in first out), pro-rata, etc.

Transfer of asset tokens can be done by an entity to change a proportion of the asset owned by the entity. This can allow for automation of legacy transfer processes by removing many of the manual, labor-intensive, and offline steps, and therefore can do at least one of: lower costs as a result of simplifying the transfer processes, speed up the time to consummate a transfer; simplify any post-transfer accounting and audit requirements for a transfer, and enable rapid reallocation of benefits derived from ownership.

The asset tokens can be based on real property. This can enable creation of a dynamic marketplace for real estate which can do at least one of: create liquidity in previously illiquid assets; reduce transaction costs associated with real estate transfers; provide the opportunity to democratize investment in real estate assets by lowering the minimum investment threshold, thus allowing many more investors to participate; and opens the opportunity to a global audience. This can also help create opportunities for financial engineering constructs which may be unavailable with standard real estate transactions, thereby lowering to or reallocating the costs of capital to the participants. This can also enable participation from industry participants, such as title insurance companies and valuation companies, to expand their markets by participating in an ongoing series of small transactions that can occur intraday (think the stock market) versus legacy real estate's larger but infrequent singular transactions, such as purchasing a home, the frequency of which may be measured in years The transaction can be performed between an occupant of the real property and an investor of real property. This can occur indirectly by using fiat currency paid by the occupant to the issuing entity (SPE) in exchange for TIC interests. The SPE can then uses the fiat currency to purchase (e.g., redeem) asset tokens from the investors, deactivates them and then transfer them to treasury. This can allow for transfer of TIC interests between an unaccredited Occupant and holders of the Asset Token who will initially be accredited investors (if US based).

The transaction can include rent payment by the occupant to the investor by transferring the asset tokens such that the rent payment is based on a proportion of asset tokens owned by the investor. Each investor can be entitled to a pro-rata amount of the rent paid by the occupant based on the proportion of the asset tokens they own. This can enable periodic payments or the proportional rent to the owner of asset tokens which could occur in fiat currency or other cryptocurrencies such as a stablecoin, Bitcoin, etc. This can also facilitate payments by tracking ownership of asset tokens and recording such payments on an immutable blockchain ledger. This can also enables creation of multiple cash flow waterfalls based on ownership of asset token ownership. This can also enable creation of risk mitigation strategies by allocating asset tokens to funds and/or pools specifically designed for risk mitigation purposes.

The rent payment can change based on a change in the proportion of TIC owned by the occupant. This can help enable a dynamic rent calculations to occur. Unlike traditional real estate financing methods where payments tend to be fixed regardless of prepayments or current balance of the obligation, basing the rent payment on the proportional amount of the TIC interests owned by the occupant can help enable real time payment changes to occur. For example, a homeowner paying rent at a 4.39% annualized rate to the investors could purchase $1,000 of additional equity in their home, immediately changing the proportion of their TIC interest, and see their monthly payment instantly fall by $3.66 per month. From the Occupants perspective, this can provide an immediate return on their investment as their rent payments are reduced in real time as they increase the proportion of the TIC they own. On the flip side, an investor can also realize an immediate return should they increase their proportional holdings in the TIC via Asset Token purchases. In both examples, the reverse is also true.

The transaction can include a change in TIC between the occupant and the investor. This can help enable investors to hold positions in owner occupied single family residential real estate for the first time ever. This asset class may not currently exist as a current method for an investor to gain access to the single family residential real estate market is to hold positions directly or indirectly in rental properties which can require property management and other operational overhead to manage the non-owner occupied tenancies. This can enables the occupant to access equity in their home above the minimum required equity threshold in real time and at an exceptionally low cost. This can eliminate the need for refinancing a home by converting home ownership into cash.

Figure 13:
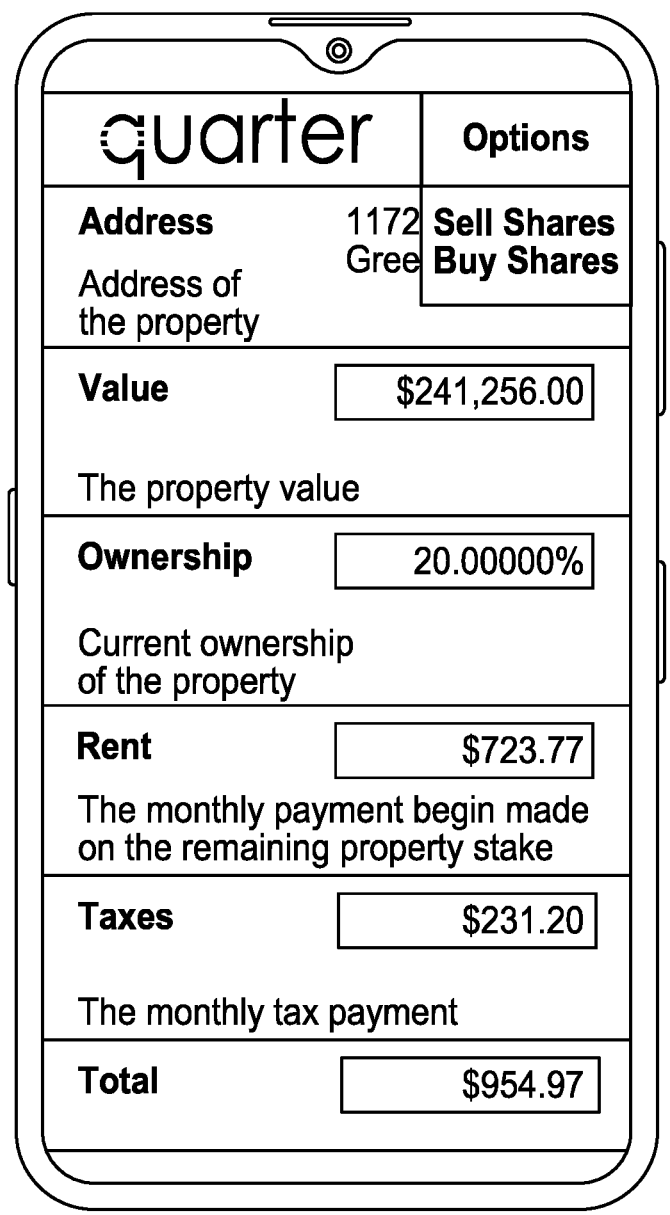
FIG. 13 is an example screen shot, according to aspects of the disclosure.
Figure 14:
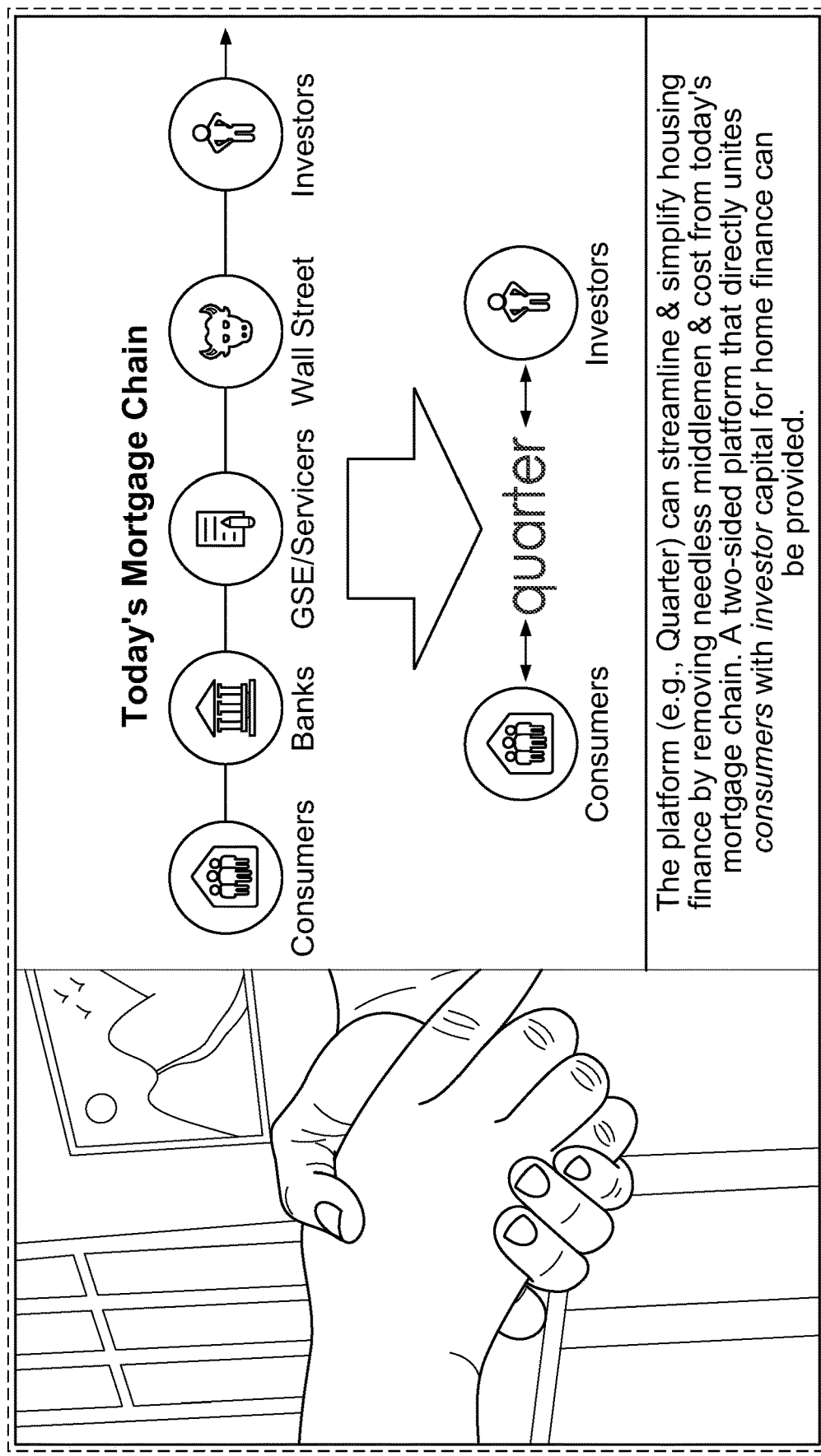
Figure 15A:
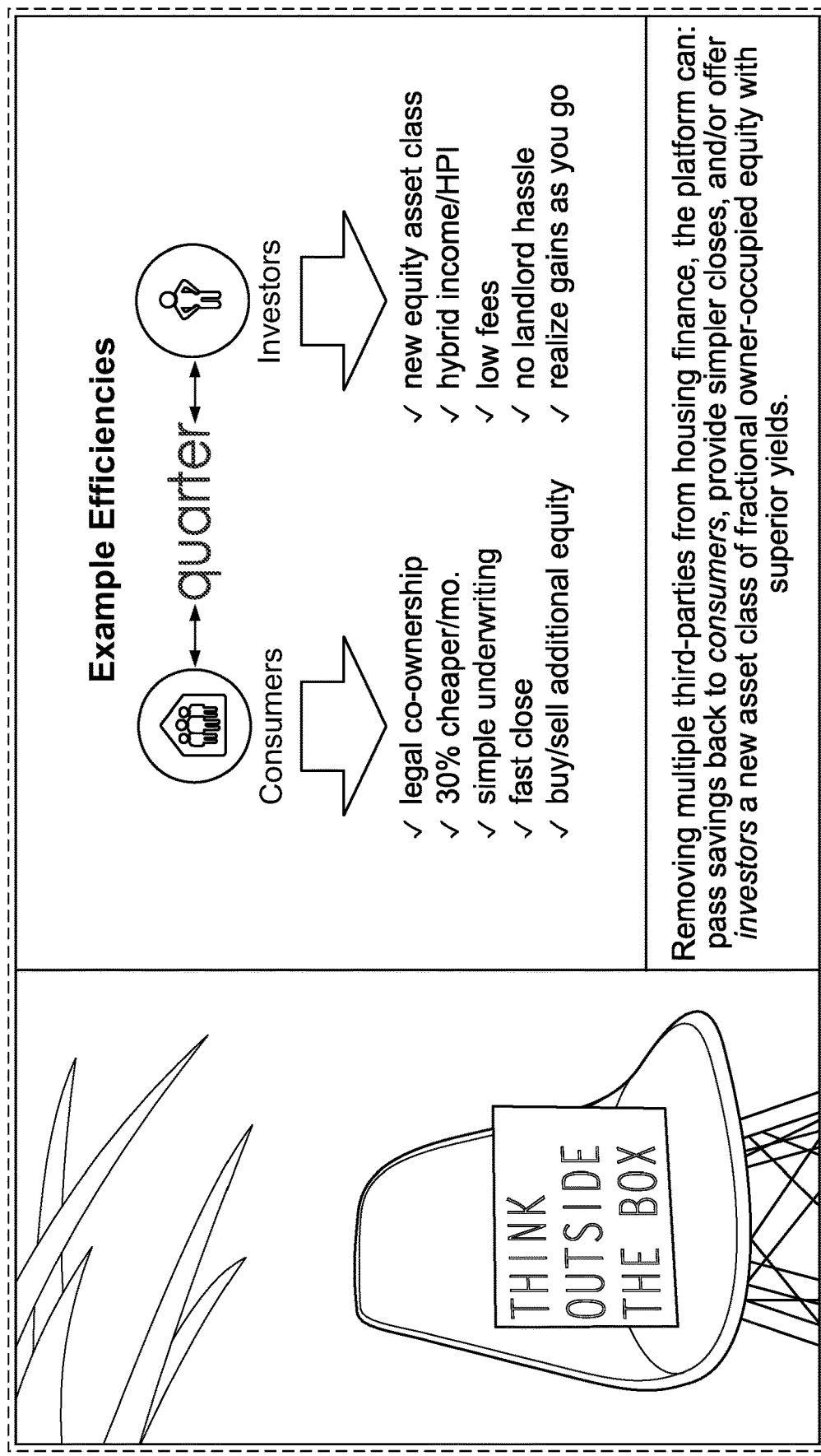
Figure 15B:
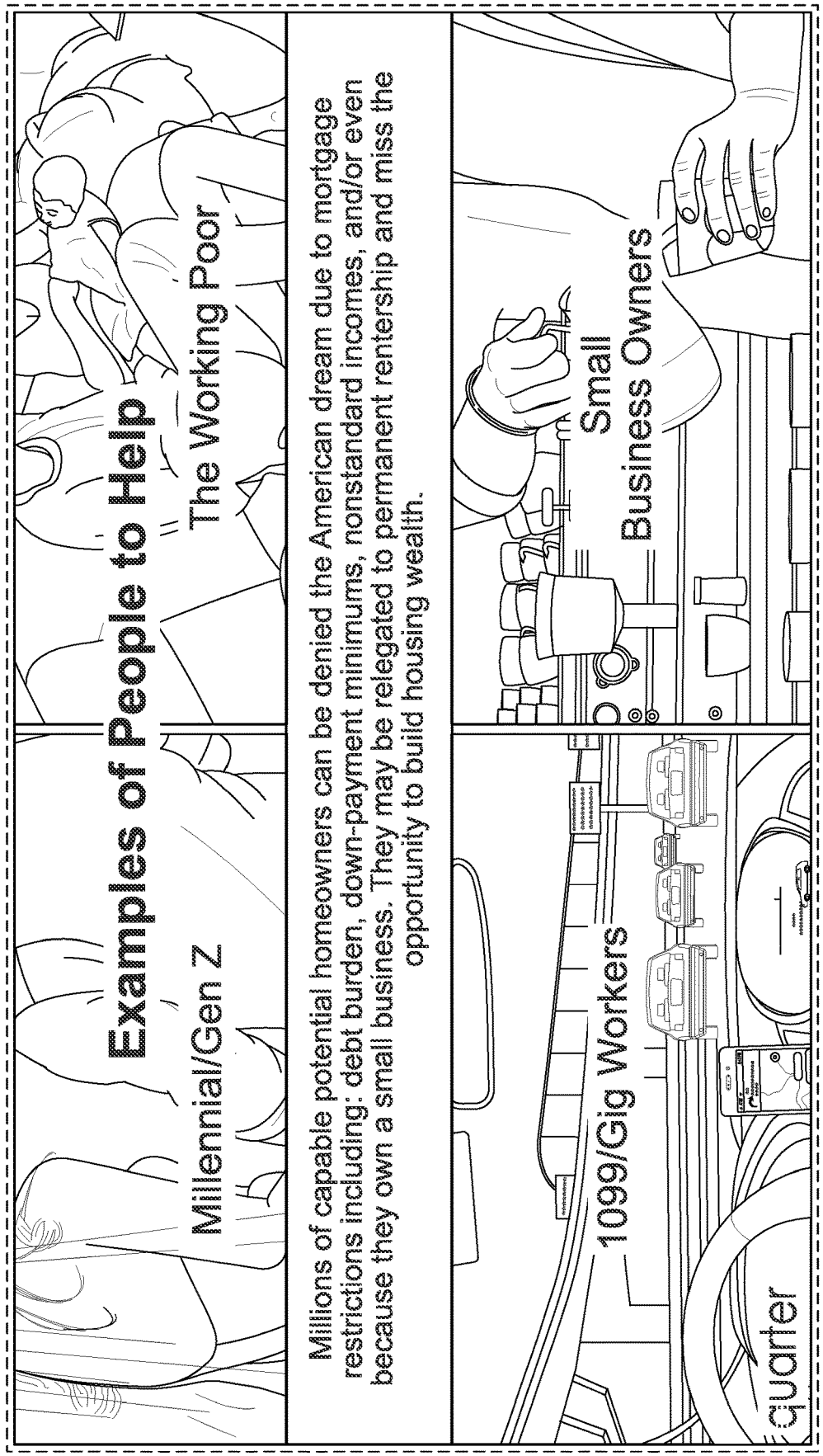
Figure 16:
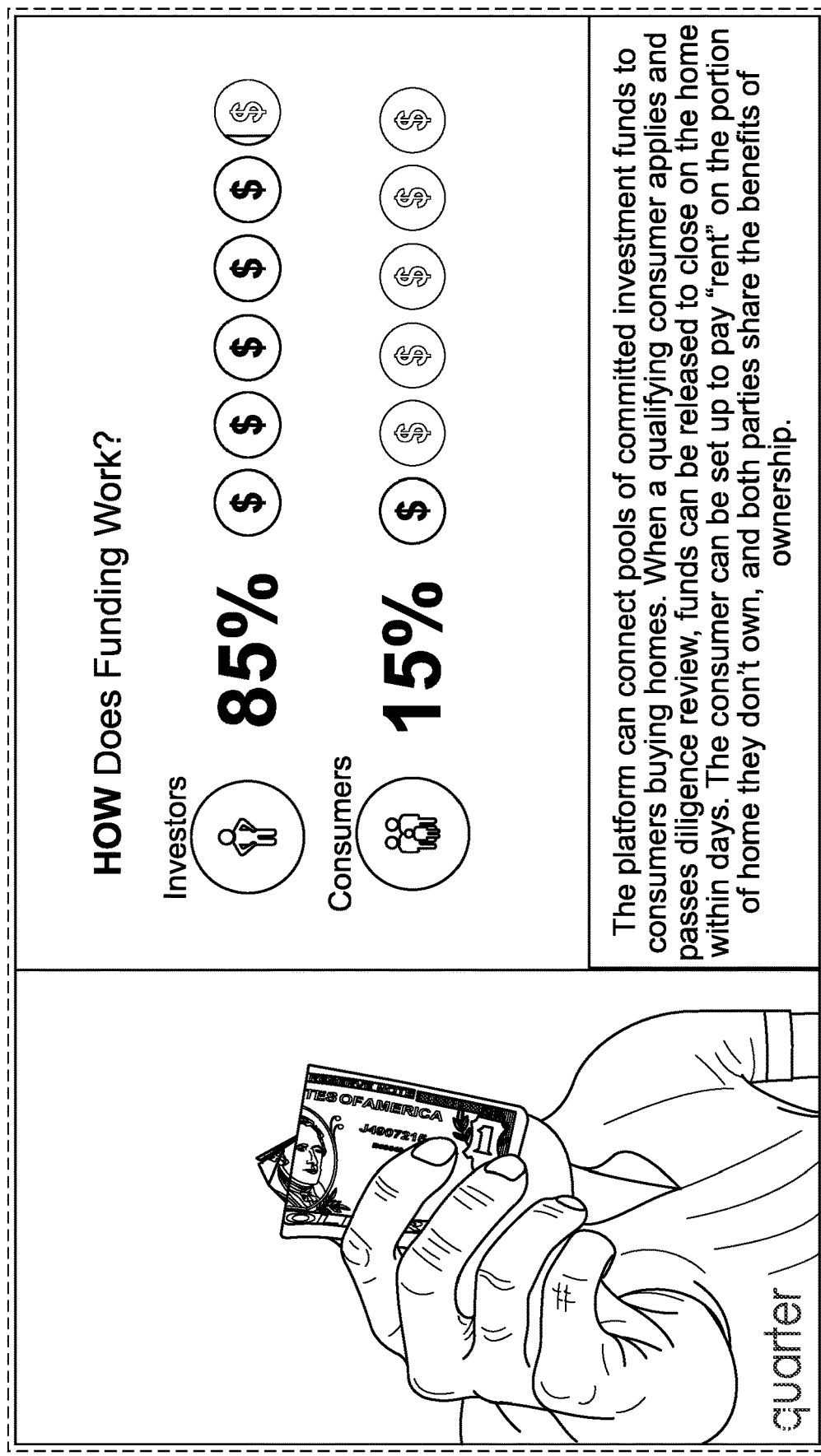
Figure 19:
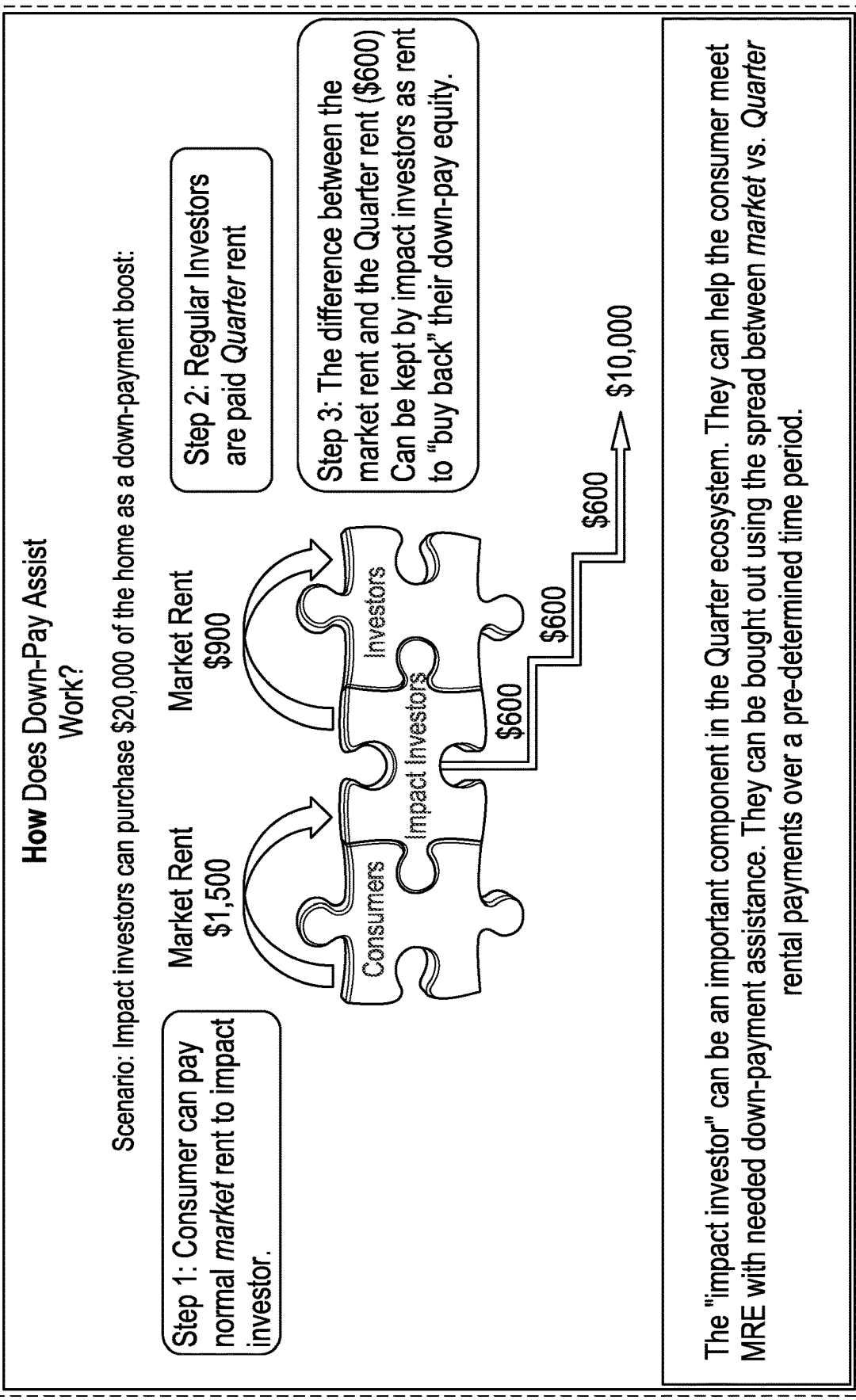
Figure 20:
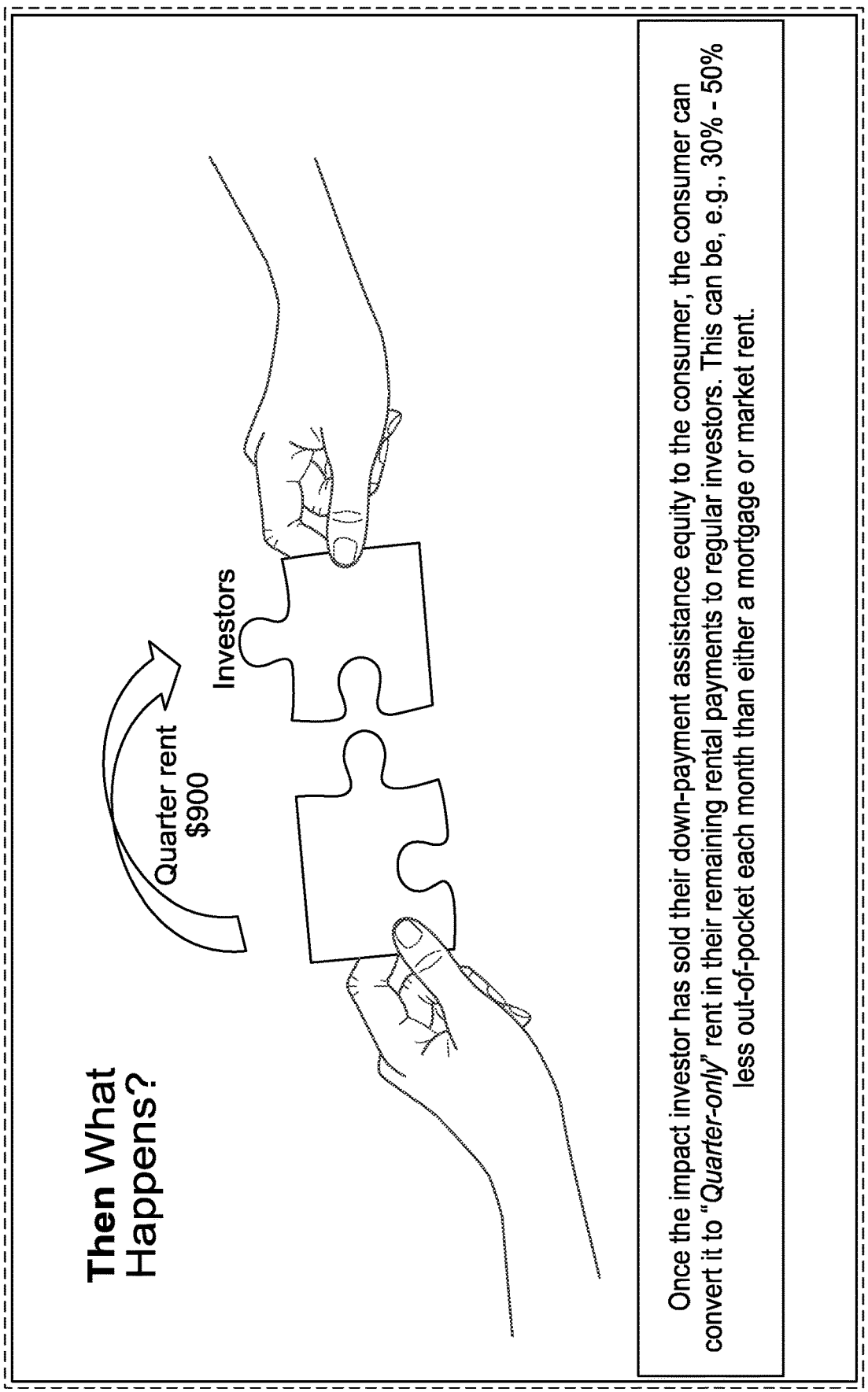
Figure 21A:
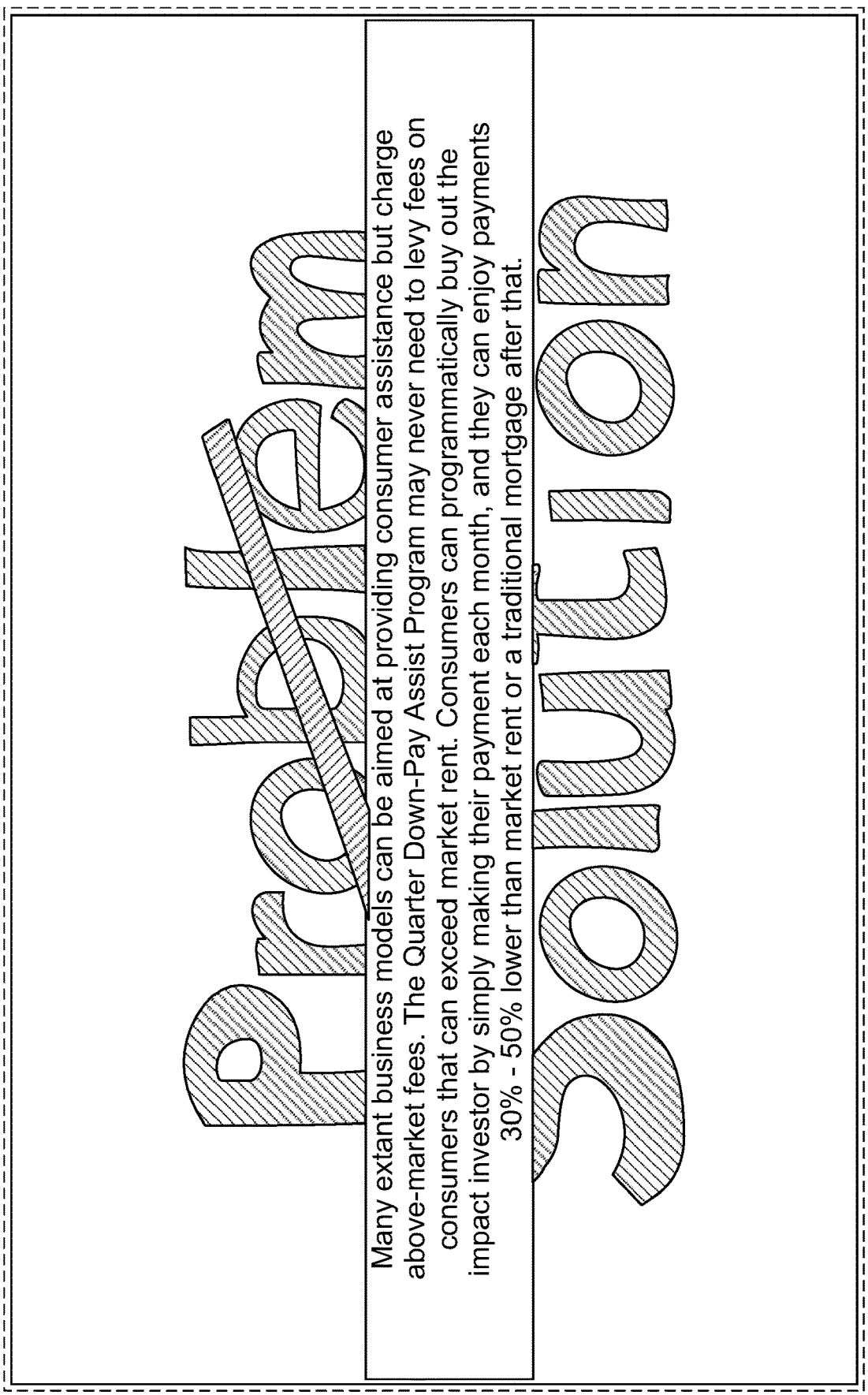
Figure 21B:
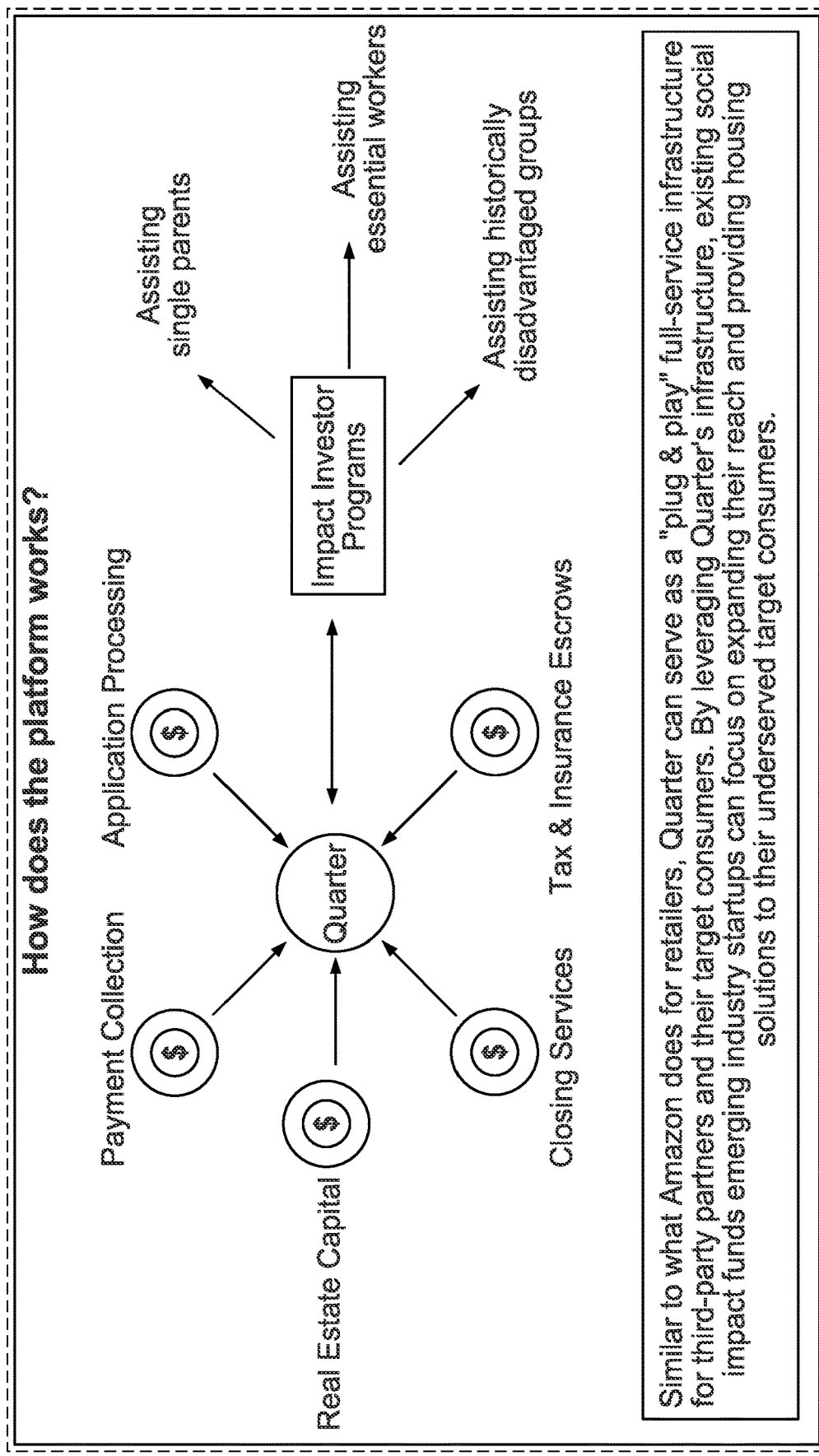

The owner/manager can use a server and/or a mobile application. For example, for the mobile application in FIG. 13, an Occupant can use this or a similar system on a desktop computer, etc. to check their ownership position, sell equity on demand and transfer the fiat current (USD) into their account within seconds.

The transaction can also include transfer of asset tokens between multiple investors. This can enable the development of a secondary market for fractional real estate ownership. This can create the opportunity for both price discovery in ways which has not been available before. Current legacy fractional ownership constructs, such as commercial real estate syndicates or REITs, may have typically traded at a substantial discount to the value of the assets they own due to their illiquidity and lack of a robust secondary market. This can allow for the democratization of real estate investing by enabling transactions between accredited investors who initially purchased the Asset Tokens from the issuer and non-accredited investors, who can later purchase the Asset Tokens after SEC mandated holding periods toll. This can also provide the opportunity for industry providers of third-party services, such as title companies, to expand their market as they will have opportunities to provides their products and services each time an Asset Token transfers vs only when and entire property is transacted in the legacy environment. This can also provide the opportunity for investors to manage risk by custom building portfolios of assets based on specific diversification targets. For example, an investor could decide to balance their portfolio of homes in areas experiencing high home price appreciation by divesting some asset tokens of homes in those areas and allocating the proceeds to additional investments in areas with slower growth but with higher rental yields.

The Asset Token can have a static nominal (e.g., face) value and may not change in value to the upside (downside can be a different story as prices can fall). The appreciation component can be stripped from the Asset Token such that any value derived from appreciation of the home can be contractually transferred to the HPI Asset Pool (e.g., some form of BK remote entity) which can be the issuer of the HPI Tokens. For example, a $10 investment in an Asset Token can return $10 to the holder from the proceeds of sale at the time the underlying home is sold.

The HPI asset pool can represent the appreciation of all the homes in the group of homes. The HPI Asset Pool can aggregate the appreciation of all of the appreciation for all homes on the network into one location which can enable issuance of HPI Tokens which can be used in various financial engineering constructs.

An HPI asset token can be issued that can be guaranteed by the appreciation of all the homes in the group of homes.

The act of issuing HPI Tokens can unlock unrealized gains which may otherwise only be accessible upon either sale of the home or by obtaining a cash out refinance mortgage. This can provide a floor to the value of the HPI tokens based on the value of the underlying home appreciation rights transferred to the pool. There can also be a compounding effect whereas there may be future HPA or HPD which can occur on the value of the assets already within the pool. Given that there has never been a true HPI index backed by actual homes, this can create a unique opportunity to use HPI tokens to speculate on the future movement of the housing market and to further create additional financial instruments and/or derivatives based on the HPI token.

A minimum retained equity can be determined comprising a minimum amount of equity a home occupant must retain based on pre-defined underwriting criteria. Computing the minimum retained equity can provide the basis to manage risk through the use of asset token holdings (by the occupant, the risk pool, and/or the impact investor) and can be a departure to the way a traditional mortgage has operated which can be more inclined to increase cashflow through the use of higher interest rates. Having "skin in the game:; can be a predictor of future consumer performance and the platform has designed the MRE model to reflect that. It further servers as one of the core components from which the occupant's ability to transfer ownership is built upon.

The minimum retained equity can be a dynamic number which changes based on a current property profile and a current occupant profile and is used to manage default risks. MRE as a risk mitigation tool can be helpful in that when combined with a fractional ownership structure, the need to subsidize defaulting consumers by creating extra cash flow via higher interest rates from the entire cohort of similarly situated consumer can be eliminated and can be replaced with by use of a combination of a risk pool of asset tokens contributed by every home on the platform and requiring each homeowner to retain a minimum amount of TIC equity in the property, both of which can be drawn from in the even to occupant non-performance. In short, each homeowner can bear the risk of their own default as they will lose their equity (just like a mortgage) but aren't required to pay monies in the form of higher payments which they will not get back if they do not default. This can enable a much more dynamic risk mitigation strategy on both an individual consumer basis but also within the entire risk pool. This can also enable dynamic adjustments in underwriting criteria base on the overall health of the risk pool such that new applications can be reviewed and MRE calculated on the basis of the risk pool as well as individual consumer stats. Further, the ability to buy or sell equity in real time can be managed, as the risk profile of the consumer can change the amount of excess equity available to transfer and/or convey to cash (defined as occupant owned equity in excess of MRE) can also change.

Ownership of an HPI asset for a property can be transferred to an HPI asset pool by the asset holder in exchange for an HPI asset token. The ability to separate the HPI from the underlying asset can allow for unrealized gains to be carried forward and made liquid in real time.

HPI tokens can be issued contemporaneously with asset tokens when a home is initially boarded onto a platform for a group of homes. This can enable the holding periods required by US (and potentially other jurisdictions) securities laws to run in parallel with the periods during which home price appreciation can be measured (e.g., HPI Intervals) such that when the tokens are unlocked at the end of the period the restrictions on transfer can be removed and the tokens can be freely transferred on a token exchange to both accredited and non-accredited investors. The tolling of the holding period can democratize the investments as it enables nonaccredited investors to acquire and hold the HPI Tokens. This can also reduce risk for asset token holders in that they are able to immediately transfer (e.g., sell) HPI tokens in order to reduce their exposure to home price fluctuations. Without the tolling of the holding period, they could be exposed to a 12 month holding period.

HPI tokens issued with asset tokens can be locked when issued and remain locked unless they are unlocked under pre-defined conditions. This can reduce or eliminate the need to conduct subsequent token offerings to the extent that HPI Tokens can be issued in sufficient quantities to fulfill the obligations to pay the asset token holder for future HPA gains.

Locked HPI Tokens may not be separable from asset tokens that transfer after issuance. This can enable transfer of asset tokens along with HPI Tokens which may be the rights to future HPA gains in a single transaction. This can also help toll the holding period by eliminating the need to issue new HPI tokens each time the asset token is transferred.

An updated valuation can be done for each home in a group of homes on the platform in order to calculate the change in value of each home during a current period. This can enable the calculation of the value of the underlying appreciation assets transferred to the HPI pool. This can also enable the immediate pricing and transfer of TIC interests between the occupant and the investors. This can also enable creation of a secondary market for asset tokens where frequent valuations may assist with price discovery.

At the time of each updated valuation, the home price appreciation (HPA) or home price depreciation (HPD) can be calculated for the current period, wherein the HPA or HPD can be the difference between the valuation determined at the end of a previous period and the valuation determined at the end of the current period. This can provides a basis on which to calculate the number of HPI tokens to be unlocked for each asset token. This can enable the HPI token to act as a true home price index using the homes on the platform.

A boarding value and/or transfer value can be substituted for a previous period difference: when a home was boarded onto the platform during the current period or within a pre-defined amount of time preceding the current period; or when an occupancy token was transferred to a new occupant during the current period or within the pre-defined amount of time preceding the current period. This can enables methods to avoid double counting appreciation when issuing HPI tokens or when asset tokens are transferred. This can also enables automated tracking of investor basis and nominal value of the asset tokens and adjustments in nominal values of asset tokens in times of falling home prices. This can allow for investors who hold asset tokens to have their HPI token allocation tracked and/or calculated differently based on when they were purchased and how home prices have moved since doing the above.

Pro-rata adjustments can be made, for example, if the first period is short (e.g., a predetermined time). A reset can be done when secondary transfers occur after a value decline. In order to facilitate frequent realization of HPI gains via the unlocking of HPI tokens, there may need to be a minimum holding time established, much like the way dividends work with stocks. In the even to value decline, the nominal value of the asset token may be reset so that the holder of the asset token does not receive a double payout for HPA. An example would be a home in which investor holdings are valued at 100K when the asset tokens are issued and subsequently rises to 150K. HPI tokens can be unlocked periodically based on the 50K rise in value. Then the value falls back to 120K and then rises again to 140K. The asset token owner who did not sell his or her asset tokens during this period may not be entitled to unlock additional HPI tokens based on the rise in value from 120K to 140K. A high-water mark can be established such that no HPI tokens can be unlocked until the valuation surpasses the high-water mark of 150K. However, if an asset token holder decides to sell their tokens prior to the high-water mark being reached after a decline (e.g., let's assume they sell at 100K), they may have the nominal value of the asset token reset such that they only receive net proceeds equal to the lower valuation of in this case 100K. However, the new owner of the Asset Tokens may begin at 100K and therefore may be entitled to unlock HPI tokens for any increase above 100K.

The HPI can be unlocked when the HPA for the current period is >0 and satisfies the following conditions: the number of HPI tokens unlocked for each asset token is computed by dividing the total HPA by the market price of the HPI tokens; and/or a computed number of HPI tokens unlocked for each asset token is multiplied by a predetermined amount (e.g., 0.9) and divided by the total number of asset tokens held by investors. There may be no HPA, but instead if there is be HPD for the current period, then no HPI tokens may be unlocked. This is a value proposition of the HPI Tokens. They can be unlocked in tandem with HPA and enable the holder of Asset Tokens to realize gains which would otherwise be inaccessible without selling and/or refinancing the home with a traditional mortgage. Further, this can create the opportunity for very small price movements to be realized, unlike a refinance or sale where the fees and costs associated with the transaction may consume much of the HPA gain.

When a home is sold that has appreciated sufficiently to cause issuance of HPI tokens, the sale proceeds that the HPI token pool is entitled to receive pursuant to the issuance of HPI tokens can be utilized to purchase HPI tokens that are then burned. Burning of the HPI tokens can manage inflationary pressures from impacting the value of the HPI Tokens. This can also eliminate the need to distribute the proceeds from the sale of the homes underlying the HPI appreciation pool which may increase costs and accounting/regulatory burden ultimately reducing the overall return potential for investors.

Minimum retained equity can be determined using: an applicant's credit score, back end DTI, risk pool composition, or property specific data as inputs, or any combination thereof.

The minimum retained equity can be used to calculate a minimum down payment required by an applicant who wishes to be an occupant in order to close on the home. Today's financial markets (e.g., the real estate financing market) can use interest rates as a first line tool for risk management. The net result can be that those who can least afford it typically pay the most. To level the playing field and create a more accessible path to homeownership, we have designed the concept of minimum retained equity or "MRE".

Asset tokens purchased by an impact investor can be locked until: the occupant purchases equity from the Impact Investor, in which case a corresponding number of asset tokens shall be unlocked, redeemed and transferred to treasury; and/or the occupant chooses to exercises their right to sell the property, in which case the asset tokens shall be: unlocked, redeemed and burned after distribution of the proceeds of the sale of the property in the event that the home leaves the network; or unlocked, redeemed and transferred to treasury after distribution of net proceeds from the sale; and/or the occupant is in default and the home is sold in which case the asset tokens shall be: unlocked, redeemed and burned after distribution of the proceeds of the sale of the property in the event that the home leaves the network; or unlocked, redeemed and transferred to treasury after distribution of net proceeds from the sale. In this way, the entire impact investor program can be plug and play, meaning that it fits within the overall design of the platform and comports with the management of asset tokens. The impact investor can provide the required capital to supplement the capital the occupant can provide to meet the MRE requirements to become a homeowner. By merging impact investors holdings with the occupant, asset investment opportunities with and without an impact investor can be homogenized sufficiently that from the perspective of the non-impact investors perspective so they can be treated exactly the same from a risk perspective. They can be governed by smart contracts which can enable everything described above to be automated. Further, smart contracts can be customized to meet the specific needs of impact investors allowing them to better focus on serving their clients. The owner/manager can provide the turn key infrastructure for socially conscious capital to plug into.

Impact investor's asset tokens can be entitled to pro-rata distribution of net proceeds in the event of sale of the home under at least one of the following circumstances: a) asset tokens held by impact investors are entitled to their pro-rata share of the rent plus 100% of the enhanced rent paid by the occupant; b) a portion of the enhanced rent payment shall be used to purchase additional TIC interests in the home from the impact investor's holdings in the SPE; c) upon purchase of TIC interests equal to the entirety of the impact investors holdings in the SPE, enhanced rent payment obligations of the occupant shall terminate; d) impact investors asset tokens are entitled to pro-rata distribution of net proceeds in the event of sale of the home; e) asset tokens held by impact investors are entitled to their pro-rata share of the rent plus 100% of the enhanced rent paid by the occupant; f) a portion of the enhanced rent payment shall be used to purchase additional TIC interests in the home from the impact investor's holdings in the SPE; and g) upon purchase of TIC interests equal to the entirety of the impact investors holdings in the SPE, enhanced rent payment obligations of the occupant shall terminate. This can be helpful in that it can provide an arbitrage opportunity created by the delta between the typical monthly cost of rent to an occupant and typical market rent in a given zip code. This can allow impact investors to enjoy significant yields which can attract both philanthropic entities as well as socially conscious capital in search of superior yields. The ability to manage asset tokens can provide the ability to merge occupant and impact investor holdings which can be the cornerstone to homogenizing the overall investment opportunity sufficient to keep additional risk based pricing at bay. Further, the ability to reduce costs through smart contract automation can help provide a benefit to the occupant.

FIGS. 14-21B illustrate other example aspects of the disclosure.

Example Computer System

Figure 5:
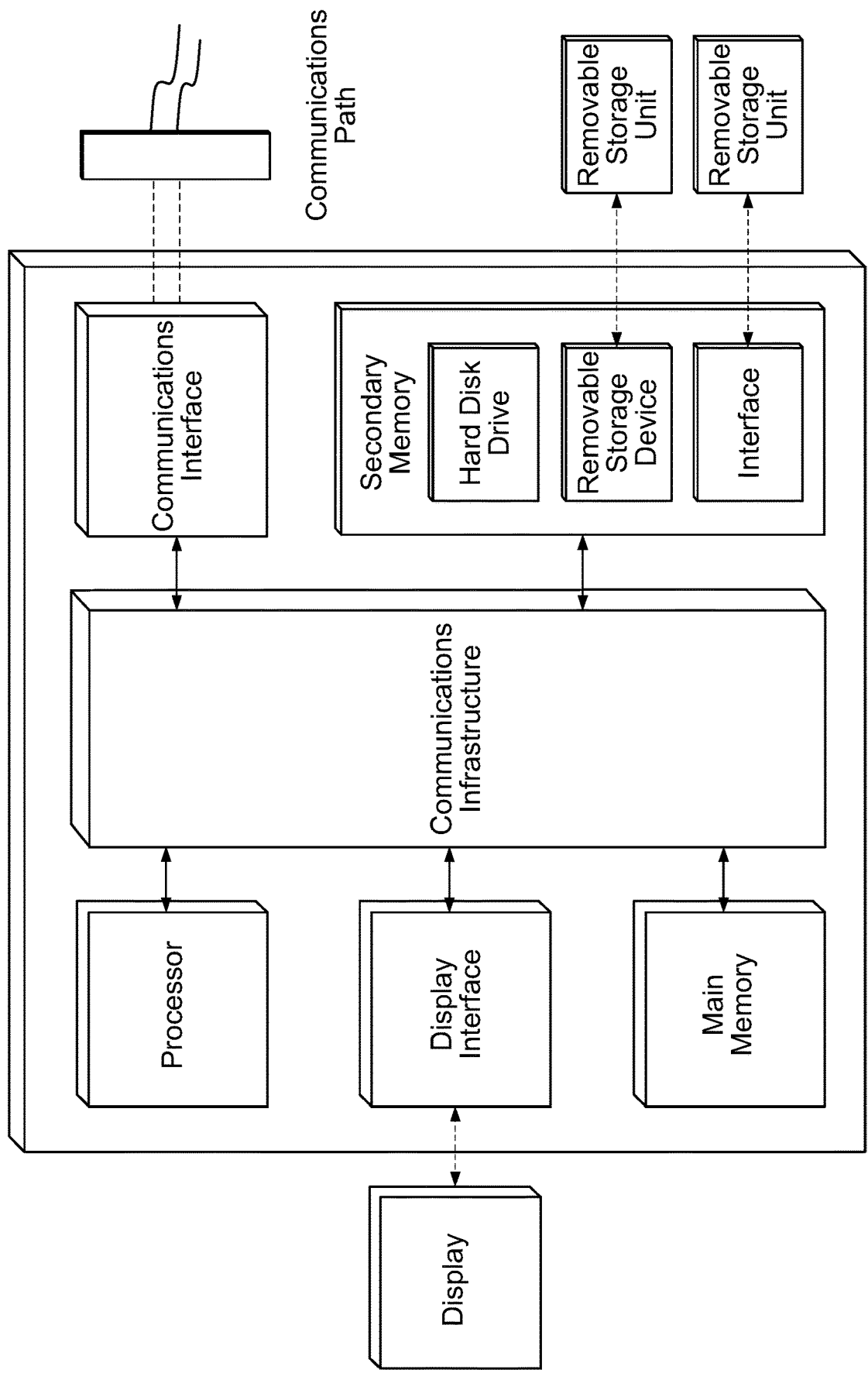
FIG. 5 illustrates an example computer system, according to aspects of the disclosure.

Various embodiments of the present disclosure are described in terms of the example computer system of FIG. 5. After reading this description, it will become apparent to a person skilled in the relevant art how to implement the present disclosure using other computer systems and/or computer architectures. The present disclosure can be implemented on a computer system or on a mobile application. In addition, the present disclosure can be implemented using blockchain or not using blockchain. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device may be a special purpose, or a general-purpose processor device specifically configured to perform the functions discussed herein. The processor device may be connected to a communications infrastructure, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system may also include a main memory (e.g., random access memory, read-only memory, etc.), and may also include a secondary memory. The secondary memory may include the hard disk drive and a removable storage drive, such as a floppy disk drive, a magnetic tape drive, an optical disk drive, a flash memory, etc.

The removable storage drive may read from and/or write to the removable storage unit in a well-known manner. The removable storage unit may include a removable storage media that may be read by and written to by the removable storage drive. For example, if the removable storage drive is a floppy disk drive or universal serial bus port, the removable storage unit may be a floppy disk or portable flash drive, respectively. In one embodiment, the removable storage unit may be non-transitory computer readable recording media.

In some embodiments, the secondary memory may include alternative means for allowing computer programs or other instructions to be loaded into the computer system, for example, the removable storage unit and an interface. Examples of such means may include a program cartridge and cartridge interface (e.g., as found in video game systems), a removable memory chip (e.g., EEPROM, PROM, etc.) and associated socket, and other removable storage units and interfaces as will be apparent to persons having skill in the relevant art.

Data stored in the computer system (e.g., in the main memory and/or the secondary memory) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system may also include a communications interface. The communications interface may be configured to allow software and data to be transferred between the computer system and external devices. Exemplary communications interfaces may include a modem, a network interface (e.g., an Ethernet card), a communications port, a PCMCIA slot and card, etc. Software and data transferred via the communications interface may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a phone line, a cellular phone link, a radio frequency link, etc.

The computer system may further include a display interface. The display interface may be configured to allow data to be transferred between the computer system and external display. Exemplary display interfaces may include high-definition multimedia interface (HDMI), digital visual interface (DVI), video graphics array (VGA), etc. The display may be any suitable type of display for displaying data transmitted via the display interface of the computer system, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory and secondary memory, which may be memory semiconductors (e.g., DRAMs, etc.). These computer program products may be means for providing software to the computer system. Computer programs (e.g., computer control logic) may be stored in the main memory and/or the secondary memory. Computer programs may also be received via the communications interface. Such computer programs, when executed, may enable computer system to implement the present methods as discussed herein. In particular, the computer programs, when executed, may enable processor device to implement the methods, as discussed herein. Accordingly, such computer programs may represent controllers of the computer system. Where the present disclosure is implemented using software, the software may be stored in a computer program product and loaded into the computer system using the removable storage drive, interface, and hard disk drive, or communications interface.

The processor device may comprise one or more modules or engines configured to perform the functions of the computer system. Each of the modules or engines may be implemented using hardware and, in some instances, may also utilize software, such as corresponding to program code and/or programs stored in the main memory or secondary memory. In such instances, program code may be compiled by the processor device (e.g., by a compiling module or engine) prior to execution by the hardware of the computer system. For example, the program code may be source code written in a programming language that is translated into a lower level language, such as assembly language or machine code, for execution by the processor device and/or any additional hardware components of the computer system. The process of compiling may include the use of lexical analysis, preprocessing, parsing, semantic analysis, syntax-directed translation, code generation, code optimization, and any other techniques that may be suitable for translation of program code into a lower level language suitable for controlling the computer system to perform the functions disclosed herein. It will be apparent to persons having skill in the relevant art that such processes result in the computer system being a specially configured computer system uniquely programmed to perform the functions discussed above.

Techniques consistent with the present disclosure provide, among other features, systems and methods for performing transactions via asset tokens and a blockchain based smart contract.

CONCLUSION

While various exemplary embodiments of the disclosed system and method have been described above it should be understood that they have been presented for purposes of example only, not limitations. It is not exhaustive and does not limit the disclosure to the precise form disclosed. Modifications and variations are possible in accordance with the above teachings or may be acquired from practicing of the disclosure, without departing from the breadth or scope.

While the disclosure has been described with reference to numerous specific details, one of ordinary skill in the art will recognize that the disclosure can be embodied in other specific forms without departing from the spirit of the disclosure. In addition, a number of the figures illustrate processes. The specific operations of these processes may not be performed in the exact order shown and described. The specific operations may not be performed in one continuous series of operations, and different specific operations may be performed in different embodiments. Thus, one of ordinary skill in the art would understand that the invention is not to be limited by the foregoing illustrative details, but rather is to be defined by the appended claims.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the terms "including", "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

The invention claimed is:

1. A method for performing a real property transaction via asset tokens and a blockchain based smart contract, comprising:
  issuing a plurality of tokens using blockchain, on a decentralized network, wherein the tokens are cryptographically secured using public key infrastructure, wherein a portion of the plurality of tokens are fungible and represent ownership in the real property, and wherein at least one of the plurality of tokens is non-fungible and represents a right to occupancy of the real property and a right to transact in fractional equity, represented by the portion of the plurality of tokens, of the real property;
  transmitting, by a first computing device associated with a holder of one of the at least one non-fungible tokens, a first network function request related to the real property transaction to the decentralized network, the first network function request comprising a payment;
  using an algorithm to determine which of the plurality of tokens are included in the real property transaction; and
  creating a secure record of the real property transaction and a secure chain of title for the real property,
  wherein the blockchain based smart contract, associated with the non-fungible token, enables a first investor to purchase equity from a second investor over time until a minimum equity threshold is met, wherein the minimum equity threshold is based on at least one of a homeowner's credit score and a debt to income ratio.

2. The method of claim 1, wherein the portion of the plurality of tokens that are fungible represent ownership in a special purpose entity that holds a tenants-in-common interest in the real property.

3. The method of claim 1, further comprising:
  issuing home price index (HPI) tokens that represent rights to future appreciation of the real property.

4. The method of claim 3, wherein the HPI tokens are initially locked and may be unlocked based on appreciation of the real property during predetermined time intervals.

5. The method of claim 1, further comprising:
  performing periodic valuations of the real property to calculate changes in value during predetermined time intervals.

6. The method of claim 1, wherein the payment is based on a proportion of tokens owned by an investor.

7. The method of claim 1, wherein the blockchain based smart contract automatically adjusts the payments based on changes in ownership proportions represented by the plurality of tokens.

8. The method of claim 1, further comprising:
  transmitting, by a second computing device associated with an investor, a second network function request to the decentralized network to purchase additional tokens of the plurality of tokens representing fractional ownership in the real property.

9. The method of claim 1, wherein the algorithm used to determine which tokens are included in the transaction may utilize a first-in-first-out (FIFO) or pro-rata allocation method.

10. The method of claim 1, wherein the non-fungible token representing occupancy rights may be transferred to a new occupant, subject to meeting predefined criteria established in the blockchain based smart contract.

11. A system for performing a real property transaction, comprising:
  a blockchain-based decentralized network;
  a first computing device; and at least one processor configured to:
   issue a plurality of tokens using blockchain, on a decentralized network, wherein the tokens are cryptographically secured using public key infrastructure, wherein a portion of the plurality of tokens are fungible and represent ownership in the real property, and wherein at least one of the plurality of tokens is non-fungible and represents a right to occupancy of the real property and a right to transact in fractional equity, represented by the portion of the plurality of tokens, of the real property;
   transmit, by the first computing device associated with a holder of one of the at least one non-fungible tokens, a first network function request related to the real property transaction to the decentralized network, the first network function request comprising a payment;
   use an algorithm to determine which of the plurality of tokens are included in the real property transaction; and
   create a secure record of the real property transaction and a secure chain of title for the real property,
   wherein a smart contract, on the blockchain-based decentralized network and associated with the non-fungible token, enables a first investor to purchase equity from a second investor over time until a minimum equity threshold is met, wherein the minimum equity threshold is based on at least one of a homeowner's credit score and a debt to income ratio.

12. The system of claim 11, wherein the portion of the plurality of tokens that are fungible represent ownership in a special purpose entity that holds a tenants-in-common interest in the real property.

13. The system of claim 11, where the at least one processor is further configured to:
   issue home price index (HPI) tokens that represent rights to future appreciation of the real property.

14. The system of claim 13, wherein the HPI tokens are initially locked and may be unlocked based on appreciation of the real property during predetermined time intervals.

15. The system of claim 11, where the at least one processor is further configured to:
   perform periodic valuations of the real property to calculate changes in value during predetermined time intervals.

16. The system of claim 11, wherein the payment is based on a proportion of tokens owned by an investor.

17. The system of claim 11, wherein the blockchain based smart contract automatically adjusts the payments based on changes in ownership proportions represented by the plurality of tokens.

18. The system of claim 11, where the at least one processor is further configured to:
   transmit, by a second computing device associated with an investor, a second network function request to the decentralized network to purchase additional tokens of the plurality of tokens representing fractional ownership in the real property.

19. The system of claim 11, wherein the algorithm used to determine which tokens are included in the transaction may utilize a first-in-first-out (FIFO) or pro-rata allocation method.

20. The system of claim 11, wherein the non-fungible token representing occupancy rights may be transferred to a new occupant, subject to meeting predefined criteria established in the smart contract.

* * * * *